(12) United States Patent
Yamamoto et al.

(10) Patent No.: US 8,312,233 B2
(45) Date of Patent: *Nov. 13, 2012

(54) STORAGE SYSTEM THAT IS CONNECTED TO EXTERNAL STORAGE

(75) Inventors: Yasutomo Yamamoto, Sagamihara (JP);
Kazuhisa Fujimoto, Kokubunji (JP);
Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,060

(22) Filed: Nov. 9, 2010

(65) Prior Publication Data

US 2011/0055429 A1    Mar. 3, 2011

Related U.S. Application Data

(63) Continuation of application No. 12/724,565, filed on Mar. 16, 2010, now abandoned, which is a continuation of application No. 11/723,996, filed on Mar. 23, 2007, now Pat. No. 7,711,896, which is a continuation of application No. 10/683,688, filed on Oct. 9, 2003, now Pat. No. 7,228,380.

(30) Foreign Application Priority Data

Jun. 23, 2003  (JP) .................................. 2003-177451

(51) Int. Cl.
*G06F 12/00* (2006.01)
*G06F 13/00* (2006.01)
*G06F 13/28* (2006.01)

(52) U.S. Cl. .......................... 711/154; 711/161; 711/162

(58) Field of Classification Search .......... 711/161–162, 711/154

See application file for complete search history.

(56) References Cited

U.S. PATENT DOCUMENTS

| | | | |
|---|---|---|---|
| 4,536,836 A | 8/1985 | Dodd et al. | 711/113 |
| 5,126,889 A | 6/1992 | Walden | 360/53 |
| 5,133,060 A | 7/1992 | Weber et al. | 711/113 |
| 5,274,645 A | 12/1993 | Idelman et al. | 714/6 |
| 5,404,487 A | 4/1995 | Murata et al. | |
| 5,459,856 A | 10/1995 | Inoue | 711/113 |
| 5,459,857 A | 10/1995 | Ludlam et al. | |
| 5,644,783 A | 7/1997 | Kochiya et al. | |
| 5,706,465 A | 1/1998 | Kurokawa et al. | |
| 5,734,813 A | 3/1998 | Yamamoto et al. | 714/6 |
| 5,774,641 A * | 6/1998 | Islam et al. | 714/6.12 |

(Continued)

FOREIGN PATENT DOCUMENTS

EP          1132805 A2      9/2001

(Continued)

*Primary Examiner* — Yaima Campos
(74) *Attorney, Agent, or Firm* — Brundidge & Stanger, P.C.

(57) ABSTRACT

A first storage system is connected to a second storage system, and an external device within the first storage system is provided to a host as a device of the second storage system. The second storage system includes a cache control section having cache adaptors, each controlling a disk and a cache, a protocol conversion section including protocol adaptors that switch requests from the host to appropriate ones of the cache adaptors, a management adaptor, and an internal network that mutually connects the cache adaptors, the protocol adaptors and the management adaptor. The first storage system being connected to any of the protocol adaptors is connected to the second storage system. The second storage system executes a processing for the external device by the cache control section, or connects to the first storage system through the protocol conversion section without the cache control section executing processing for the external device.

10 Claims, 16 Drawing Sheets

U.S. PATENT DOCUMENTS

| | | | |
|---|---|---|---|
| 5,884,098 A | 3/1999 | Mason, Jr. | |
| 5,964,886 A | 10/1999 | Slaughter et al. | |
| 6,098,129 A * | 8/2000 | Fukuzawa et al. | 710/65 |
| 6,256,740 B1 | 7/2001 | Muller et al. | |
| 6,356,977 B2 | 3/2002 | Ofek et al. | |
| 6,385,681 B1 | 5/2002 | Fujimoto et al. | |
| 6,529,976 B1 | 3/2003 | Fukuzawa et al. | |
| 6,542,961 B1 | 4/2003 | Matsunami et al. | |
| 6,708,254 B2 | 3/2004 | Lee et al. | |
| 6,785,715 B2 | 8/2004 | Mizuno | 709/213 |
| 6,810,469 B2 * | 10/2004 | Tsuboki et al. | 711/159 |
| 7,120,757 B2 | 10/2006 | Tsuge | 711/147 |
| 7,228,380 B2 | 6/2007 | Yamamoto et al. | |
| 7,711,896 B2 | 5/2010 | Yamamoto et al. | |
| 2002/0062429 A1 | 5/2002 | Tsuboki et al. | 711/154 |
| 2002/0156944 A1* | 10/2002 | Benhase et al. | 710/8 |
| 2003/0204683 A1 | 10/2003 | Okumoto et al. | |
| 2003/0221077 A1 | 11/2003 | Ohno et al. | |
| 2007/0168598 A1 | 7/2007 | Yamamoto et al. | |
| 2010/0169569 A1 | 7/2010 | Yamamoto et al. | |

FOREIGN PATENT DOCUMENTS

| | | |
|---|---|---|
| JP | 071252491 | 6/1995 |
| JP | 2001142648 | 5/2001 |
| JP | 2001312483 | 11/2001 |
| JP | 2003044421 | 2/2003 |
| WO | 02093298 | 11/2002 |

* cited by examiner

Asynchronous Destaging Processing 257

External Device Path Reconfiguration Processing 256

STORAGE SYSTEM THAT IS CONNECTED TO EXTERNAL STORAGE

The present application is a continuation of application Ser. No. 12/724,565, filed Mar. 16, 2010, now abandoned; which is a continuation of application Ser. No. 11/723,996, filed Mar. 23, 2007, now U.S. Pat. No. 7,711,896, which is a continuation of application Ser. No. 10/683,688, filed Oct. 9, 2003, now U.S. Pat. No. 7,228,380, the contents of which are incorporated herein by reference.

BACKGROUND OF THE INVENTION

1. Field of the Invention

The present invention relates to storage systems that store data to be used by a computer in a computer system, and more particularly to storage systems that use a cluster structure.

2. Related Background Art

As the amount of data treated in a computer system has drastically increased, the capacity of storage that stores data has been increased accordingly. As one of the approaches to reduce the management cost for large capacity storages, a storage system can be designed such that a large amount of data is collectively stored in a single large capacity storage of high performance, high reliability and high connectivity, instead of distributing a large amount of data and storing them in many small size storages. By reducing the number of storages that are subject to the management, the management cost for storages such as fault management and maintenance cost can be reduced.

However, when a single storage system is used to store a large amount of data, and is connected to many hosts, the number of control processors and storage devices that are mounted on the inside of the storage system increases. Furthermore, since a high speed linked operation is required among the numerous control processors and storage devices, the speed of internal buses and control memories needs to be increased and conflicts among many control processors need to be avoided. However, increasing the speed of internal buses and control memories and avoiding conflicts among control processors would present major challenges in terms of technology and costs in both hardware and software.

A cluster technology may be applied to a storage system in order to solve the problems described above and to realize a large capacity storage of a large scale and low cost.

A cluster storage system is typically composed of a plurality of relatively small scale storage nodes that are mutually connected through mutual connection systems such as switches to thereby realize a large capacity storage system. Many configurations are possible to compose such a large capacity storage system. However, they may be the same in that input/output requests received by a cluster storage system are distributed to storage nodes that are mounted with target devices of the input/output requests, and each of the input/output requests is processed by each of the corresponding storage nodes, respectively. Generally, a plurality of modules such as host interface, disk drive, control processors, memory, control memory, disk cache and the like are mounted on each of the storage nodes, like an ordinary storage system, and these modules are connected within the respective storage node via an internal network. At each of the storage nodes, these internal modules are used to process input/output requests with respect to the storage device.

In the cluster storage system described above, the disk cache and the control memory in each storage node are shared only by the control processors that are present in the same storage node. Therefore, in the cluster storage system described above, the performance requirements for internal buses and memory bandwidth can be alleviated. Furthermore, a plurality of storage nodes in the number that matches with a storage capacity required by a computer system may be connected to compose a cluster storage system. By so doing, scalable storage systems having a variety of different capacities from small capacity to large capacity can be realized. It is noted that, in a cluster storage system, control information and data stored in disk drives may be exchanged through a inter-connection system among storage nodes for data linkage such as data replication and internal data re-location among the disk drives.

When a new storage system is introduced in an existing computer system, it is effective, for reducing the device introduction cost, to utilize an existing storage that has already been introduced in the computer system by a customer. In order to migrate the entire data on the existing storage system to a new storage, the newly introduced storage system must be equipped with a capacity equivalent to that of the existing storage system, which increases the storage introduction cost.

As one of the known methods to connect a plurality of storage systems, a first storage system is connected to a second storage system, and a storage device (hereafter referred to as a "logical device") that the first storage system provides to an upper device such as a host is provided to the host through the second storage system as a logical device of the second storage system. When the second storage system receives from the host an input/output request to access a logical device, the second storage system judges as to whether the storage device to be accessed corresponds to a logical device in the first storage system or a physical device within the second storage system, and sends the input/output request to an appropriate access destination according to the result of the judgment.

According to the conventional method described above, when the second storage system receives from the host an input/output request to access a logical device of the second storage system, which corresponds to a logical device of the first storage system (which may hereafter be referred to as an "external device"), the control processor of the second storage system judges that a device to be accessed is the external device, rewrites address information, and then transmits the input/output request to the first storage system. Accordingly, it is highly possible that the conventional method would affect the input/output processing performance for a device formed from the disk drive mounted within the second storage system (which may hereafter be referred to as an "internal device").

For example, when an input/output processing for a logical device of the second storage system which corresponds to an external device of the first storage system is executed by the control processor of the second storage system, the operation capacity of the control processor of the second storage system is consumed.

SUMMARY OF THE INVENTION

The present invention relates to a computer system comprising a first storage system and a second storage system connected to each other, wherein input/output requests from a host to the first storage system are transmitted to the first storage system through the second storage system, and a technology that reduces the processing load on the second storage system.

Also, the present invention relates to a system comprising a first storage system and a second storage system connected to each other, wherein input/output requests from a host to the first storage system are transmitted to the first storage system through the second storage system, and a technology that switches a connection configuration between the first storage system and the second storage system.

In accordance with an embodiment of the present invention, a storage system includes a first control section connected to a computer, a second control section having a storage device and a cache memory, a third control section that is connected to another storage system, and an internal network that connects the first control section, the second control section and the third control section.

When the first control section receives from the computer an input/output request to be accessed to the storage device in the other storage system, the first control section selects to transmit the input/output request to the other storage system through a first path defined by the internal network and the third control section, or through a second path defined by the internal network, the second control section and the third control section.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

Figure 1:
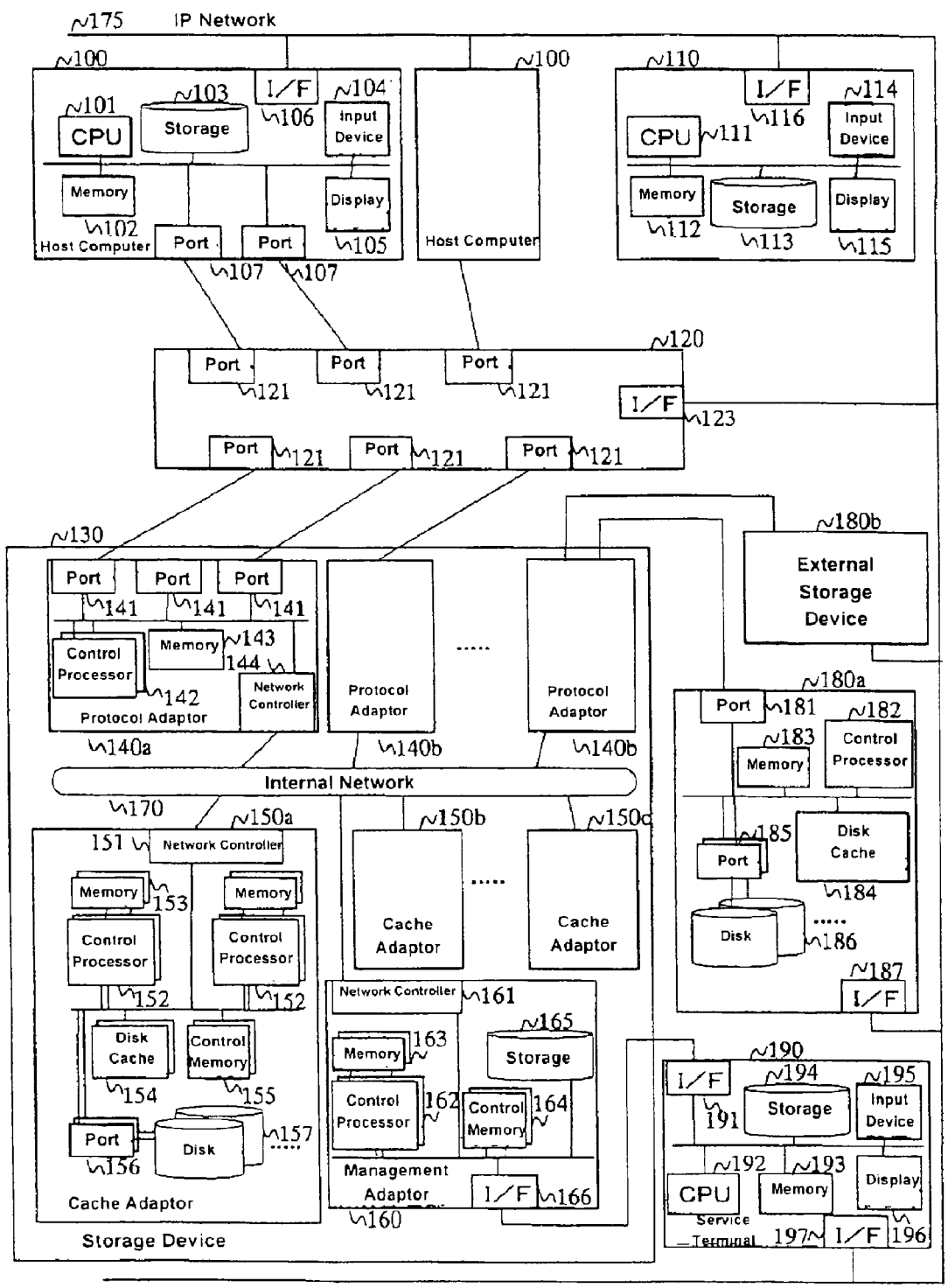
FIG. 1 shows an example of a hardware configuration of a computer system in accordance with an embodiment of the present invention.

A first embodiment and a second embodiment are described below as examples among various embodiments of the present invention.

In an example in accordance with the first embodiment of the present invention, when an external device that exists in a first storage system is defined as a logical device of a second storage system that is a cluster configured storage system, a connection configuration of the external device at the second storage system is determined, and an input/output request from a host computer to the external device is sent to an appropriate transmission destination based on the connection configuration determined.

In an example in accordance with the second embodiment of the present invention, a connection configuration introduced in the second storage system is switched to another connection configuration, and an input/output request from the host computer to the external device is distributed to an appropriate transmission destination according to the progress of the processing to switch the connection configuration.

It is noted that, in both of the first and second embodiments, the second storage system that is a cluster configured storage system is connected to the first storage system that defines an external storage system, and the second storage system has a function to provide the external device existing in the first storage system to the host computer as a device of the second storage system. Such a function is hereafter called an external storage connecting function.

Generally, in a storage system that uses storage devices, in particular in a storage system that controls a disk array such as RAID (Redundant Array of Independent Disks), the storage devices, which are physical devices actually mounted on the storage system, are correlated to logical storage devices to be provided to a host (in other words, which are recognized as storage devices by the host) (which may hereafter be called "logical devices"). By using an external storage connecting function of the second storage system, the second storage system recognizes the logical devices of the first storage system as external devices, and correlates them to logical devices of the second storage system. Then, when the second storage system receives an access request from the host computer, the second storage system judges as to whether a target logical device to be accessed, which is specified by information contained in the access request, is correlated to a physical device existing in the second storage system, or correlated to an external device existing in the first storage system, and sends the access request to an appropriate access destination based on the judgment result.

In this instance, regardless of whether a logical device that is a target of the input/output request from the host computer is correlated to an internal device existing in the second storage system or an external device existing in the first storage system, the input/output request can be processed by a control processor of the second storage system. By processing the access request to the external device from the host computer by using the control processor of the second storage system, functions such as a data copy function of the second storage system can also be applied to the external device. As a result, the system described above provides advantages in that the cost for introducing the second storage system into the computer system can be lowered, and higher device performance and a variety of functions of the second storage system can be applied to data stored in the device in the first storage system, while the existing first storage system is effectively utilized.

However, if access requests to the external device are processed by the control processor of the second storage system, the input/output processing performance of the internal device existing in the second storage system may highly likely be affected. For example, as described above, when processings relating to the external device are executed by the control processor in the second storage system, the processing resource of the control processor in the second storage system is consumed. Also, since a disk cache in the second storage system is used for storing data that is stored within the external device, there is a high possibility that data stored in the internal device may be expelled from the disk cache, which may lead to a reduction in the input/output performance due to a lowered cache hit rate.

It may be unavoidable that resources such as the control processor and cache memory of the second storage system are consumed for the first storage system when the functions such as data copy function of the second storage system are used for the external device existing in the first storage system. However, the first storage system may include an external device that is desired to be managed integrally with the internal device in the second storage system as a logical device of the second storage system in view of integration of operation managements, but is not necessary to apply the functions of the second storage system. It is not desirable, from the viewpoint of the system performance, to consume the resources of the second storage system for access processings to such an external device, in the same manner as the processings to other external devices to which the functions of the second storage system should be applied. Also, the functions of the second storage system may not necessarily be always applied to a specific external device. For example, when data is stored as a backup in the first storage system that is an external storage system by using a data copy function of the second storage system, the function of the second storage system is applied to the first storage system while the backup processing is executed, and therefore the resource of the second storage system is consumed. However, after the backup processing is completed, it is desirous if the resource of the second storage system would not be consumed as much as possible when the external device that stores the backup data is accessed.

In view of the above, the first embodiment of the present invention to be described below relates to a technology that selects a connection configuration when the first storage system is connected to the second storage system, and processes input/output requests to the external device by the second storage system depending on the connection configuration; and the second embodiment of the present invention to be described below relates to a technology for changing a connection configuration that has been once selected.

The first embodiment is described below with reference to FIGS. 1 through 14 and FIG. 17.

FIG. 1 shows an example of a hardware configuration of a computer system in accordance with an embodiment of the present invention.

The computer system includes at least one host computer (hereafter also referred to as a "host") 100, a management server 110, a fibre channel switch 120, a storage system 130 corresponding to a second storage system, one or more external storage systems 180a, 180b (generally referred to as "180") each corresponding to a first storage system, and a service terminal 190. The host 100 includes one or more ports 107, and the storage system 130 includes one or more ports 141; and the host 100 and the storage system 130 are connected to ports 121 of a fibre channel switch 120 through their respective ports. A network that is composed of the host 100 and the storage system 130 being connected through the fibre channel switch 120 is called a Storage Area Network (SAN). Further, the external storages 180a and 180b includes ports 181, and are connected to the storage system 130 through the ports 181. External devices that are composed of storage devices existing within the external storage systems 180a and 180b are provided by the storage system 130 to the host 100 as logical devices of the storage system 130. Also, the host 100, the fibre channel switch 120, the storage system 130 and the external storage system 180 are connected to a management server 110 through an IP network 175, and collectively managed by an SAN management software (not shown) that operates on the management server 110. It is noted that, although the storage system 130 in accordance with the present embodiment is connected to the management server 110 through the service terminal 190, the storage system 130 may be configured such that it is directly connected to the IP network 175.

The host 100 is a computer that includes a CPU 101, a memory 102 and other components. Software including an operating system stored in a storage 103 such as a disk device, an optical magnetic disk device or the like is read onto the memory 102, and the CPU 101 reads the stored software from the memory 102 and executes them to achieve predetermined functions. The host 100 may be equipped with an input device 104 such as a keyboard, a mouse or the like, and an output device such as a display 105. The input device 104 receives inputs provided by, for example, a host management administrator, and the output device outputs information instructed by the CPU. Also, the host 100 includes one or more ports 107 for connecting to the SAN, and one or more interface control sections 106 for connecting to the IP network 175.

The management server 110 is also a computer that has a CPU 111, a memory 112 and the like, and software such as a SAN management software stored in a storage 113 such as a disk device, an optical magnetic disk device or the like onto the memory 112, and the CPU 111 reads the stored software and executes them to achieve predetermined functions such as overall operation/maintenance management of the computer system. When the SAN management software is executed by the CPU 111, the management server 110 collects various information such as configuration information, information of resource utility rate, performance monitor information from each of the devices within the computer system with its interface control section 116 through the IP network 175. Then, the management server 110 outputs the collected information to the output device such as the display 115 to present them to the storage management administrator. Also, the management server 110 receives instructions such as an operation/maintenance instruction from the storage management administrator through the input device 114 such as a keyboard, a mouse or the like, and transmits the received operation/maintenance instruction to each of the devices through the interface control section 116.

The fibre channel switch 120 includes a plurality of ports 121. Each of the ports 121 is connected to either the port 107 of the host 100 or the port 141 of the storage system 130. The fibre channel switch 120 includes an interface control section 123, and is also connected to the IP network 175 through the interface control section 123. The fibre channel switch 120 is used such that the one or more hosts 100 connected to the fibre channel switch 120 can be accessed to the storage 120. Physically, all of the hosts 100 connected to the fibre channel switch 120 can access the storage 130 that is connected to the fibre channel switch 120. Also, the fibre channel switch 120 has a zoning function that restricts communications from a specified port to another specified port. By using the zoning function, for example, transfer of access requests within the fibre channel switch 120 can be controlled such that accesses to a specified port 141 of a specified storage 130 are limited to a specified host 100. One of various methods can be used to control a combination of a connection source port and a connection destination port. Such methods include a method that uses port IDs that are assigned to the ports 121 of the fibre channel switch 120, and a method that uses WWNs (World Wide Names) assigned to the ports 107 of the respective hosts 100 and the ports 141 of the storage systems 130.

The storage system 130 has a cluster configuration; more particularly, a configuration in which a plurality of protocol adaptors 140, a plurality of cache adaptors 150 and a management adaptor 160 that are mutually connected by an internal network 170.

Each of the protocol adaptors 140 is provided with a plurality of ports 141, one or more control processors 142, a memory 143 and a network controller 144 to be connected to the internal network 170. The protocol adaptor 140 performs processings such as a processing to specify an access target device for an input/output request received at the port 141, a processing to transfer an input/output request or data through the internal network 170 to an appropriate cache adaptor 150 or an appropriate protocol adaptors 140, or the like. In this instance, the control processor 142 calculates an upper logical device number of an upper logical device which the storage system 130 provides to the host, based on a port ID and an LUN (Logical Unit Number) included in the input/output request, and specifies an appropriate cache adaptor 150 and lower logical device number or an appropriate protocol adaptor 140 and external device number, corresponding to the upper logical device. Then, the control processor 142 transmits the input/output request containing information required to calculate the lower logical device number specified to the cache adaptor 150 or the external device number specified to the protocol adaptor 140 that has been specified. Also, the protocol adaptor 140 can be connected to another storage system such as the external storage system 180 through the port 141, and may transmit input/output requests received through another protocol adaptor 140 or input/output requests received from the cache adaptor 150 to an external storage system, such that data can be written in the external storage system or data can be read from the external storage system.

It is noted that, in the present embodiment, ports compatible with a fibre channel interface with SCSI (Small Computer System Interface) being as an upper protocol are assumed as the ports 141. However, ports compatible with another network interface for connecting storages may be used, such as an IP network interface with SCSI being as an upper protocol.

The cache adaptor 150 includes one or more ports 156, one or more disk devices 157 connected to the respective ports, one or more control processors 152, memories 153 corresponding to the respective control processors, one or more disk caches 154, one or more control memories 155, and a network controller 151 that is connected to the internal network 170.

The control processors 152 process input/output requests to the disk devices 157 existing in the same cache adaptor 150, which are received at the network controller 151 through the internal network 170. Also, when the storage system 130 makes a plurality of disk devices 157 like a disk array appear as one or a plurality of logical devices to the host 100, not making the disk device 157 appear as a single disk device, the control processor 152 manages correlations between the logical devices and the physical devices or the disk devices 157, and performs processings such as a processing to convert an access request to a logical device to an access request to the physical device or the disk device 157. Furthermore, the control processor 152 executes a variety of processings to realize data linkage functions such as a data copy function, data re-disposition function and the like.

The disk cache 154 may store in advance data that is frequently read from the disk device 157 or temporarily store write data received from the host 100, in order to increase the processing speed for access requests from the host 100. When a write-after (asynchronous destaging) is performed using the disk cache 154, in other words, when a response for a write request is returned to the host 100 after storing write data received from the host 100 in the disk cache 154, but before the write data is actually written in the disk device 157, the availability of the disk cache 154 may preferably be improved to prevent write data stored in the disk cache from being lost before it is written in the disk device 157 through, for example, using a non-volatile memory device as the disk cache 154 with a battery backup, duplicating data for improving the resistance to media troubles, or the like.

The control memory 155 stores information for managing the disk device 157, a physical device that is composed of a plurality of combined disk devices 157, and devices (external devices) in an external storage system 180 that is connected to the storage system 130 through the protocol adaptor 140, and/or information for managing correlations between the external devices or the physical devices and lower logical devices. If the control information stored in the control memory 155 is lost, data stored in the disk device 157 cannot be accessed. Accordingly, the control memory 155 may preferably be provided with a structure to improve the availability of the control memory 155 through, for example, using a non-volatile memory device with a battery backup, duplicating data for improving the resistance to media fault or the like.

The storage system 130 in accordance with the present embodiment provides to the host 100 a plurality of disk devices 157 combined that is defined as a single physical device or a plurality of physical devices (in other words, a plurality of disk devices 157 combined that is correlated to a single physical device or a plurality of physical devices), wherein one lower logical device and one upper logical device are assigned to each physical device. However, each of the disk devices 157 may be made to appear to the host 100 as one physical device with one lower logical device and one upper logical device assigned thereto. Also, a plurality of physical devices may be correlated to one or a plurality of lower logical devices, or a plurality of lower logical devices may be correlated to one or a plurality of upper logical devices.

The management adaptor 160 includes one or a plurality of control processors 162, one or a plurality of memories 163 corresponding to the respective control processors, one or a plurality of control memories 164, a storage device 165, a network controller 161 that is connected to the internal network 170, and an interface control section 166. Through reading control programs stored in the storage device 165 such as a fixed disk device onto the memory 163, and executing the control programs by the control processor 162, predetermined processings for managing configuration of the storage systems 130 and fault management are executed. The control processor 162 transmits configuration information to be presented to the storage management administrator to the service terminal 190 that is connected through the interface control section 166, receives from the service terminal 190 maintenance/management instructions inputted through the service terminal 190 by the storage management administrator, and changes the configuration of the storage system 130 storage system 130 according to the instructions received. The configuration information of the storage system 130 is stored in the control memory 164. The configuration information on the control memory 164 can be referred to or updated by the control processor 142 of the protocol adaptor 140 or the control processor 152 of the cache adaptor 150, such that configuration information can be shared among the protocol adaptors and the cache adaptors within the storage system 130. When the management adaptor 160 becomes inoperable due to a certain trouble, the entire storage system 130 becomes inaccessible. For this reason, each of the components within the management adaptor 160 may preferably be duplicated, and a plurality of management adaptors 160 may preferably be mounted within the storage system 130 to duplicate the management adaptor 160 itself. Alternatively, an interface to one or more cache adaptors 150 from the service terminal 190 may be additionally provided, and the control performed by the management adaptor 160 may be divided and born by the cache adaptor 150 and the service terminal 190, such that the management adaptor 160 may be composed only of the control memory 164. Furthermore, information on the control memory 164 may be retained by the control memory 155 of one or more cache adaptors 150, such that the management adaptor 160 may be omitted.

The internal network 170 connects the protocol adaptor 140, the cache adaptor 150 and the management adaptor 160, and executes transmission and reception of data, control information and configuration information among the aforementioned sections. By the internal network 170, the management adaptor 160 can distribute configuration information of the storage system 130 to the protocol adaptors 140 and the cache adaptors 150 that exist within the storage system 130, and manage the configuration of the storage system 130 through obtaining configuration information from the protocol adaptors 140 and the cache adaptors 150. Also, since the internal network 170 transfers access requests between the protocol adaptors 140 and the cache adaptors 150, the host 100 can access any one of the lower logical devices of any one of the cache adaptors 150 through any one of the ports 141. It is noted that the internal network may also preferably be duplicated in view of the improvement of adaptability.

The service terminal 190 includes a CPU 192, a memory 193, a storage 194, an interface control section 191 that is connected to the management adaptor 160, an interface control section 197 that is connected to the IP network 175, an input device 195 that receives inputs given by a storage management administrator, and an output device such as a display 196 that outputs configuration information and management information of the storage system 130 to a storage management administrator. The CPU 192 reads out storage management programs stored in the storage 194 onto the memory 193, and executes the storage management programs to thereby refer to configuration information, instruct configuration information and instruct operations of specific functions. The CPU 192 functions as a interface for maintenance and management of the storage system 130 between a storage management administrator or the management server 110 and the storage system 130.

It is noted that the service terminal 190 may be omitted, the storage system 130 may be directly connected to the management server 110, and the storage system 130 may be managed by using management software that operates on the management server 110.

The external storage system 180 includes one or a plurality of ports 181 that are connected to the ports 141 of the protocol adaptors 140 of the storage system 130, a control processor 182, a memory 183, a disk cache 184, one or a plurality of disk devices 186, and one or a plurality of ports 185 that are connected to the corresponding disk devices. The control processor 182 executes programs stored in the memory 183 to thereby process input/output requests, received at the ports 181, to the disk devices 186. In the present embodiment, the external storage system 180 does not have a cluster configuration, and is formed from a storage system with a configuration size smaller than the storage system 130. However, the external storage system 180 may be formed from a storage system having the same configuration and the same size as those of the storage system 130.

Figure 17:
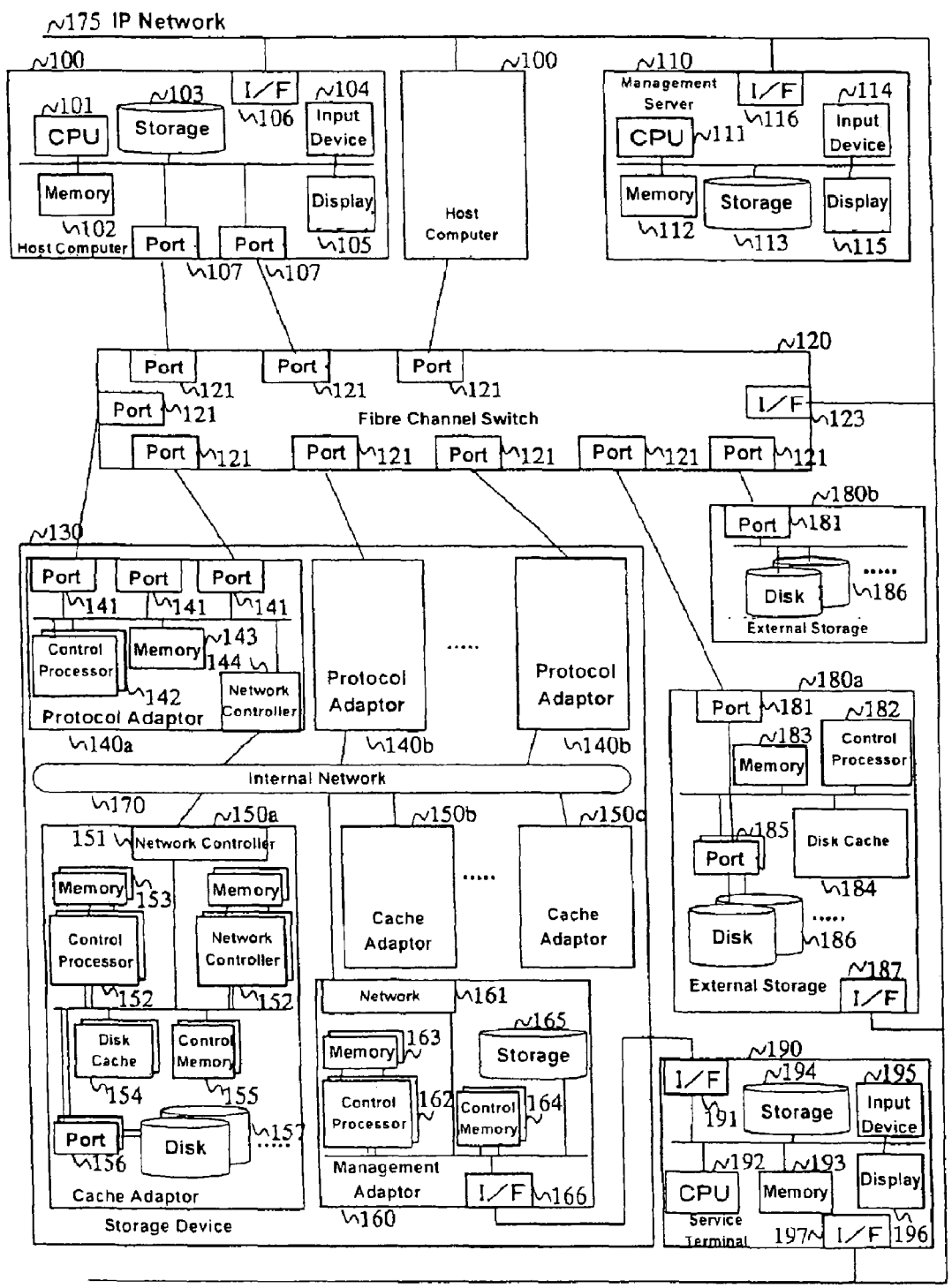
FIG. 17 shows another example of a computer system in accordance with an embodiment of the present invention.

Also, in the present embodiment shown in FIG. 1, the ports 141 of the storage systems 130 and the ports 181 of the external storage systems 180 are directly connected to each other. However, as shown in FIG. 17, the ports 141 and the ports 181 may be connected through the fibre channel switch 120 that connects the host 100 and the storage system 130 or another independent fibre channel switch. However, in this case, a zoning may preferably be set at the fibre channel switch 120 so as to prevent direct accesses from the host 100 to the external storage systems 180. Also, the external storage system 180 may be a disk array device having a disk cache 184 like an external storage system 180a shown in FIG. 17, or may be a group of single disk devices such as JBOD (Just A Bunch Of Disks) that does not have a disk cache or a control processor, like an external storage system 180b shown in FIG. 17.

Figure 2:
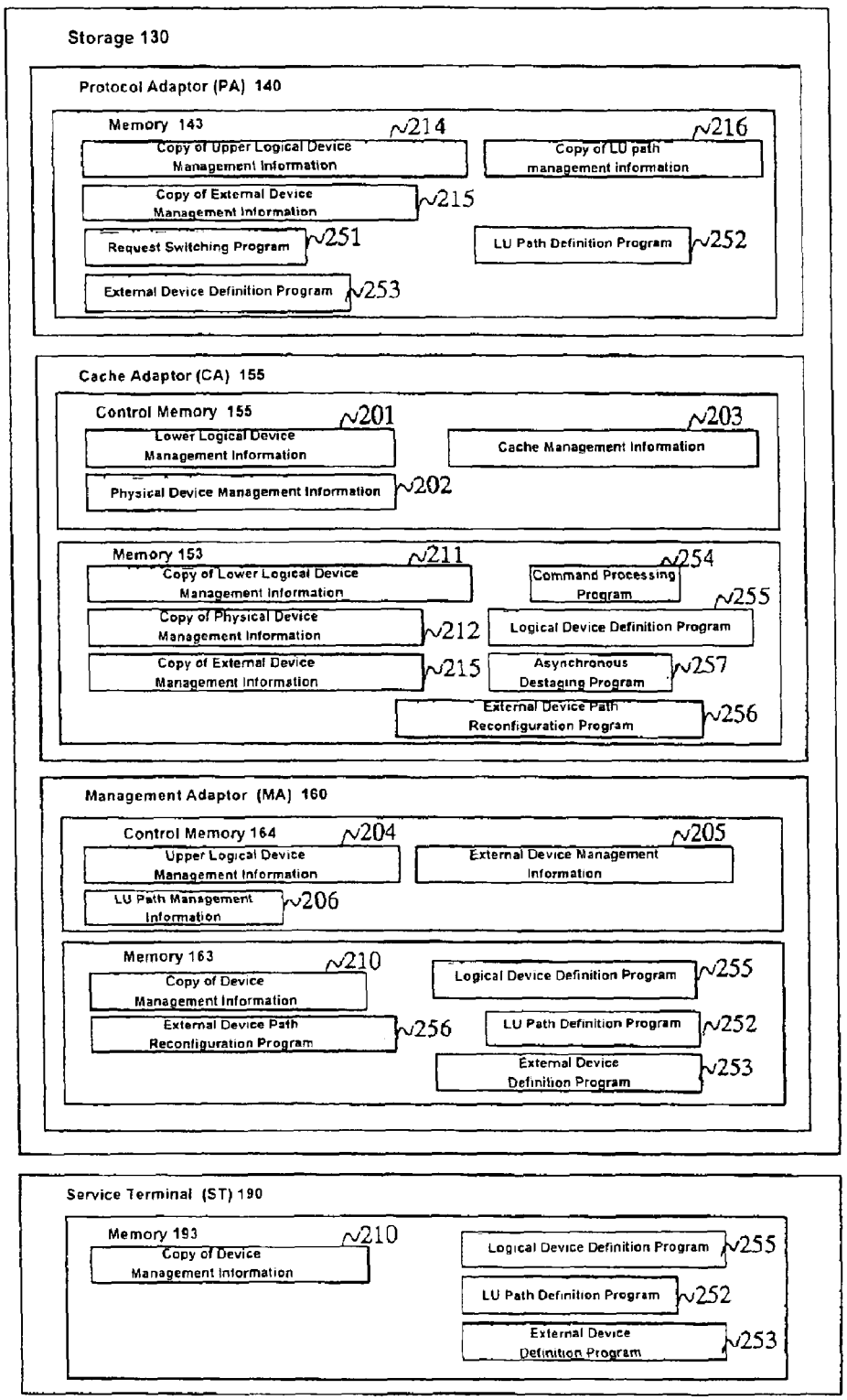
FIG. 2 shows an example of a software configuration of a storage in accordance with an embodiment of the present invention.

Next, a software configuration of the storage system 130 in accordance with an embodiment of the present invention is described below. FIG. 2 shows an example of a software configuration of control information and a program for storage control processings, which are stored in the storage system 130 and the control memory of the service terminal 190.

In the following description, the protocol adaptor 140 shall be abbreviated as PA (Protocol Adaptor), the cache adaptor 150 as CA (Cache Adaptor), the management adaptor 160 as MA (Management Adaptor), and the service terminal 190 as ST (Service Terminal), for the sake of simplification.

Also, in accordance with the present embodiment, the storage system 130 has a device hierarchy as follows: A disk array composed of a plurality of disk devices 157 is formed in each CA 150, and the disk array is managed by the CA 150 as a physical device. An external device, which is a logical device of the external storage system 180 that is connected to the PA 140, is recognized by the PA 140, and then managed by the MA 160. In the CA 150, a lower logical device is assigned to each physical device existing within the same CA or to each external device that is accessed through the same CA (in other words, the CA 150 correlates each physical device or an external device to a lower logical device). The lower logical device is a logical device that is managed within each CA 150, and its number is independently managed in each CA 150. The lower logical device is correlated by the MA 160 to an upper logical device, and is provided to the host 100 as a device of the storage system 130. In other words, what the host 100 recognizes is an upper logical device of the storage system 130, and the host 100 accesses data stored in the storage system 130 or the external storage system 180, by using information for identifying an upper logical device.

As configuration management information of the storage system 130, lower logical device management information 201, physical device management information 202 and cache management information 203 are stored in the control memory 155 of the CA 150, and upper logical device management information 204, external device management information 205 and LU path management information 206 are stored in the control memory 164 of the MA 160.

Figure 3:
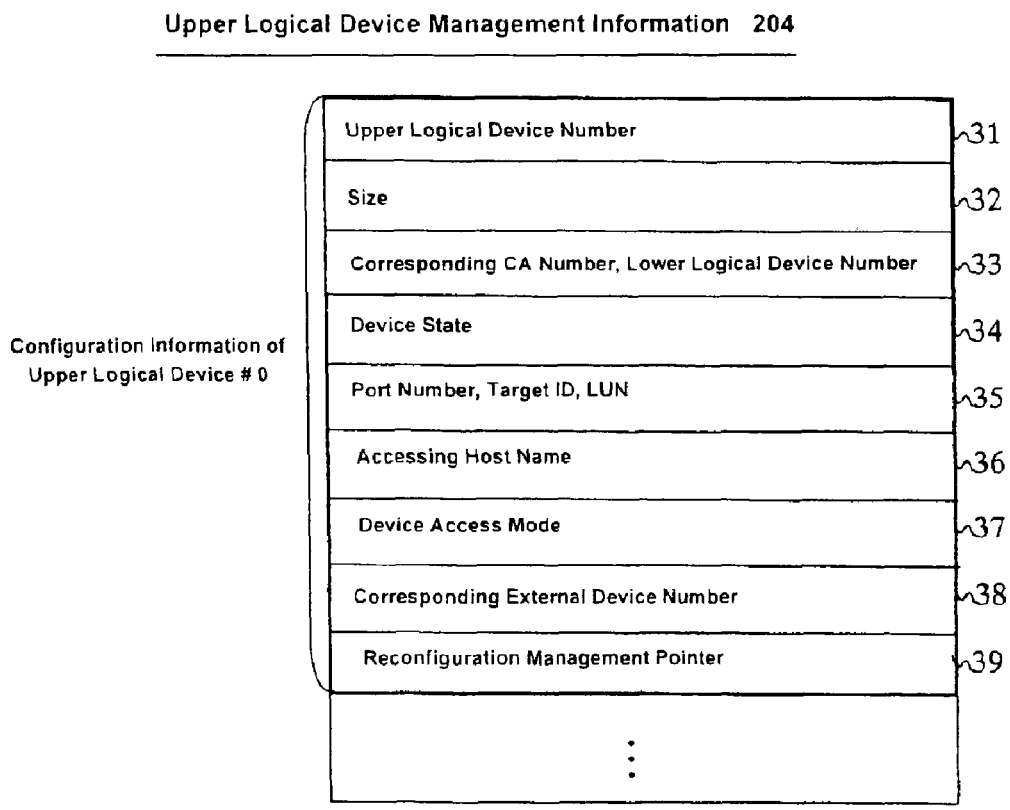
FIG. 3 shows an example of upper logical device management information.

FIG. 3 shows an example of the upper logical device management information 204. The upper logical device management information 204 retains a set of information, for each upper logical device, containing Upper Logical Device Number 31 through Corresponding External Device Number 38. It is noted that Reconfiguration Management Pointer 39 in FIG. 3 is information that is used in the second embodiment. In the first embodiment, the upper logical device management information 204 may not include Reconfiguration Management Pointer 39.

Upper Logical Device Number 31 stores a number that the MA 160 allocates to an upper logical device to identify the upper logical device. Size 32 stores a capacity of the upper logical device that is specified by Upper Logical Device Number 31. Corresponding CA Number, Lower Logical Device Number 33 stores a number of a lower logical device that is correlated to the upper logical device, and a number of a CA to which the lower logical device belongs. When an upper logical device is not defined, an invalid value is set as an entry of Corresponding CA Number, Lower Logical Device Number 33. It is noted that the lower logical device number is an entry number of the lower logical device management information 201 that is retained by the CA that manages the lower logical device. Device State 34 stores information indicating a state of the upper logical device. The state may be "on line," "off line," "unmounted," or "trouble off line." The state "on line" indicates a state in which the upper logical device is normally operating, and can be accessed from a host 100. The state "off line" indicates a state in which the upper logical device is defined, and operating normally, but cannot be accessed from a host 100 because of a certain reason, such as, an LU path is not defined. The state "unmounted" indicates a state in which the upper logical device is not defined and cannot be accessed from a host 100. The state "trouble off line" indicates a state in which a trouble occurred in the upper logical device and cannot be accessed from a host 100. In the present embodiment, for the sake of simplification of description, it is assumed that, prior to product shipment from factory, lower logical devices are assigned to physical devices formed on the disk devices 157, and upper logical devices are assigned to the lower logical devices. For this reason, an initial value of Device State 34 for each upper logical device that has been assigned to a corresponding lower logical device is "off line," and an initial value of Device State 34 for upper logical devices other than the above is "unmounted" as they are not defined.

Port Number in an entry 35 sets information that indicates which one of the plurality of ports 141 is connected to the upper logical device, in other words, port identification information of a port for accessing the upper logical device. The port identification information is a unique number that is assigned to each of the ports 141 within the storage system 130, and the entry 35 records a number of the port 141 for the upper logical device with its LUN being defined. Also, Target ID and LUN stored in the entry 35 are identifiers to identify the upper logical device. In the present embodiment, SCSI-ID that is used for accessing a device from a host computer on SCSI and LUN are used as identifiers to identify an upper logical device.

Accessing Host Name 36 is a host name that identifies a host 100 that is permitted to access the upper logical device. As a host name, any one of values can be used if it can uniquely identify each host 100 or each port 107, such as, for example, a WWN (World Wide Name) given to a port 107 of a host 100. In addition, the storage system 130 may retain management information relating to attributes of WWNs of the respective ports 141.

Device Access Mode 37 stores a value of "Via CA" or "PA direct" which indicates a processing configuration of an input/output request to the upper logical device. The value "Via CA" is set when the upper logical device is not correlated to an external device, or when the upper logical device is correlated to an external device but an input/output processing needs to be executed by the CA 150 for an input/output request to the upper logical device. The value "PA direct" is set when the upper logical device is correlated to an external device and input/output requests can be transferred directly among PA 140 without passing through the CA 150.

When the upper logical device is correlated to an external device, Corresponding External Device Number 38 sets an identification number of the external device, and sets an invalid value when it is not correlated to an external device.

Figure 4:
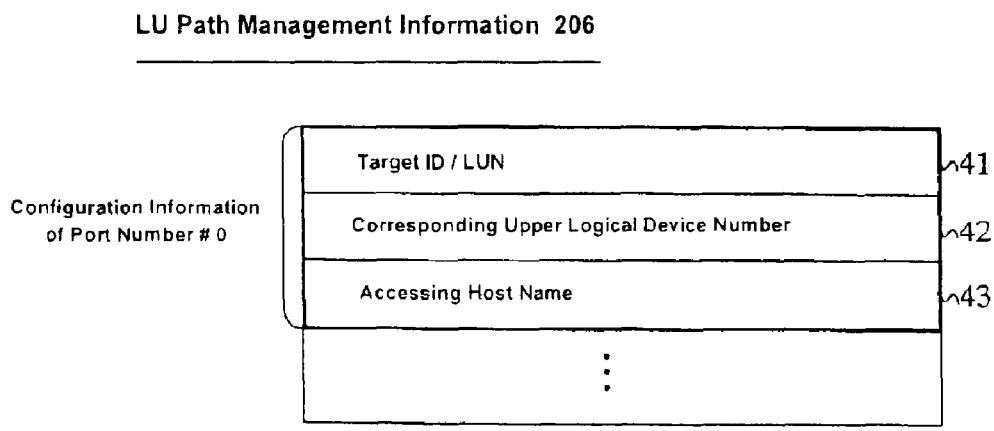
FIG. 4 shows an example of LU path management information.

FIG. 4 shows an example of the LU path management information 206. The LU path management information 206 retains information for an effective LUN (Logical Unit Number) that is defined for each of the ports 141 of the PA 140 within the storage system 130. Target ID/LUN 41 stores an address of a LUN that is defined for (assigned to) each port 141. Corresponding Upper Logical Device Number 42 stores a number of an upper logical device to which the LUN is assigned. Accessing Host Name 43 stores information indicating a host 100 that is permitted to access the LUN defined for the port 141. As information indicating the host 100, for example, a WWN given to each port 107 of the host 100 may be used.

LUNs of a plurality of ports 141 may be defined for (assigned to) one upper logical device, and the upper logical device may be accessed from the plurality of ports 141. In this case, Accessing Host Name 36 of the upper logical device management information 204 concerning the upper logical device retains a sum-set of accessing host names 43 of the LU path management information 206 for the respective LUNs of the plurality of ports 141.

Figure 5:
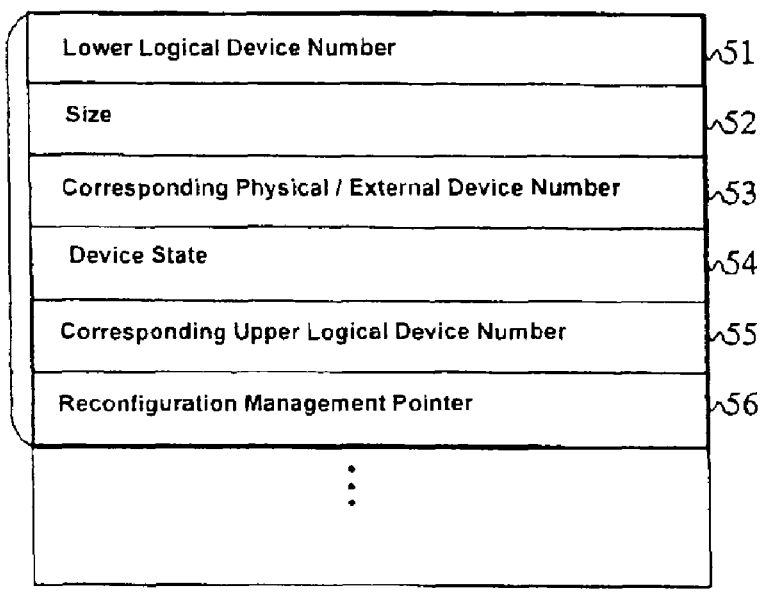
FIG. 5 shows an example of lower logical device management information.

FIG. 5 shows an example of the lower logical device management information 201. Each CA 150 retains, for each of the lower logical devices belonging to the same CA 150, a set of information as lower logical device management information containing Lower Logical Device Number 51 through Corresponding Upper Logical Device Number 55. It is noted that Reconfiguration Management Pointer 56 in FIG. 5 is information that is used in the second embodiment. In the first embodiment, each CA 150 may not necessary to retain Reconfiguration Management Pointer 56 as a part of the lower logical device information.

Lower Logical Device Number 51 registers an identification number to identify a lower logical device. Size 52 stores a capacity of the lower logical device that is specified by Lower Logical Device Number 51.

Corresponding Physical/External Device Number 53 stores an identification number of a physical device within the CA 150 that manages the lower logical device or a identification number of an external device that exists within the external storage system 180, which is correlated with the lower logical device. When a physical device or an external device is not assigned to the lower logical device, an invalid value is set at the entry 53. It is noted that the device number registered at the entry 53 may be an entry number of the physical device management information 202 retained by the CA 150 that manages the lower logical device, or an entry number of the external device management information 205 retained by the MA.

Device State 54 sets information (i.e., a value) indicating a state of the lower logical device. The values may be the same as those of the device state 34 of the upper logical device management information 204, and therefore their description is omitted. Corresponding Upper Logical Device Number 55 sets an upper logical device number that is correlated to the lower logical device.

Figure 6:
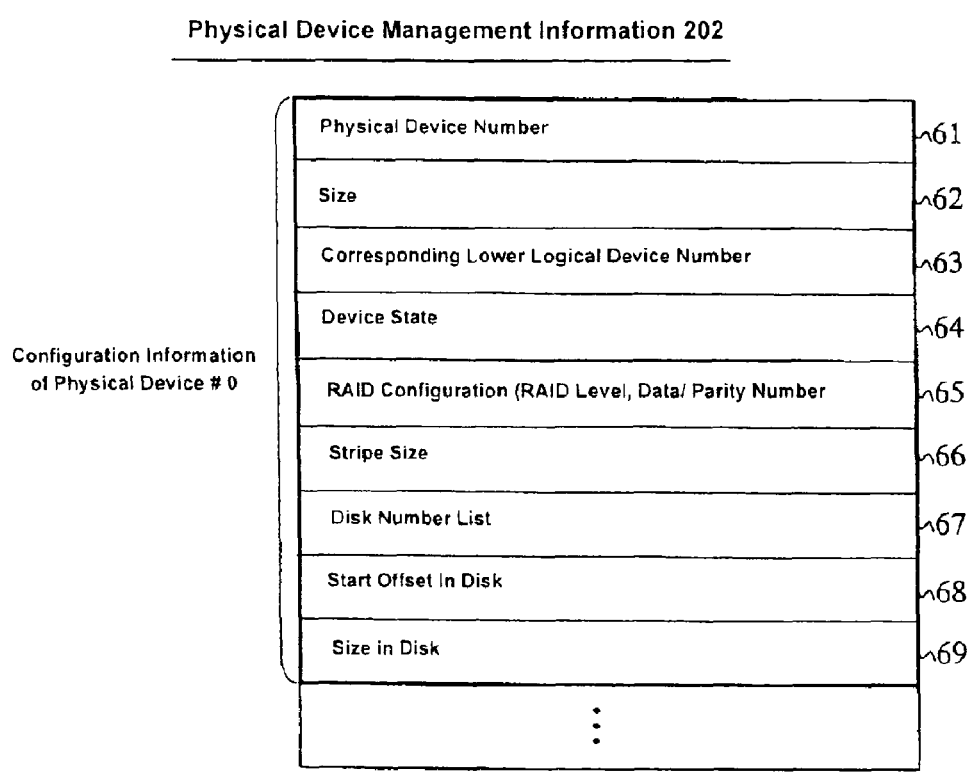
FIG. 6 shows an example of physical device management information.

FIG. 6 shows an example of the physical device management information 202 for managing physical devices that are formed from the disk devices 157 within CA 150. Each CA 150 retains, for each of the physical devices that exist within the same CA 150, a set of information containing Physical Device Number 61 through Size In Disk 69.

Physical Device Number 61 registers an identification number for identifying a physical device. Size 62 stores a capacity of the physical device that is specified by Physical Device Number 61. Corresponding Lower Logical Device Number 63 stores a lower logical device number that is managed by the CA 150 to which the physical device is correlated and the physical device belongs. When the physical device is not assigned to a lower logical device, an invalid value is set at the entry 63.

Device State 64 sets information indicating a state of the physical device. The state may be "on line," "off line," "unmounted" and "trouble off line." The state "on line" indicates a state in which the physical device is normally operating, and is assigned to a lower logical device. The state "off line" indicates a state in which the physical device is defined, and operating normally, but is not assigned to a lower logical device. The state "unmounted" indicates a state in which the physical device is not defined on the disk device 157. The state "trouble off line" indicates a state in which a trouble occurred in the physical device and cannot be assigned to a lower logical device. In the present embodiment, for the sake of simplification of description, it is assumed that, prior to product shipment from factory, physical devices are formed on the disk devices 157 in advance, and assigned to lower logical devices. For this reason, an initial value of Device State 64 for each physical device that is usable is "off line," and an initial value of Device State 64 for physical devices other than the above is "unmounted."

RAID Configuration 65 retains information concerning RAID configuration such as RAID level and the number of data disks and parity disks of the disk devices 157 to which the physical device is assigned. Similarly, Stripe Size 66 retains the length of data dividing unit (stripe) in RAID. Disk Number List 67 retains identification numbers of a plurality of disk devices 157 that compose a RAID to which the physical device is assigned. The identification numbers of the disks 157 are unique values given to identify the disk devices 157 within CA 150, respectively. Start Offset In Disk 68 and Size In Disk 69 store information indicating to which region within each of the disk devices 157 the physical device is allocated. In the present embodiment, for the sake of simplification of description, the offset and the size in each of the disk devices 157 that compose the RAID are uniform for the entire physical devices.

Figure 7:
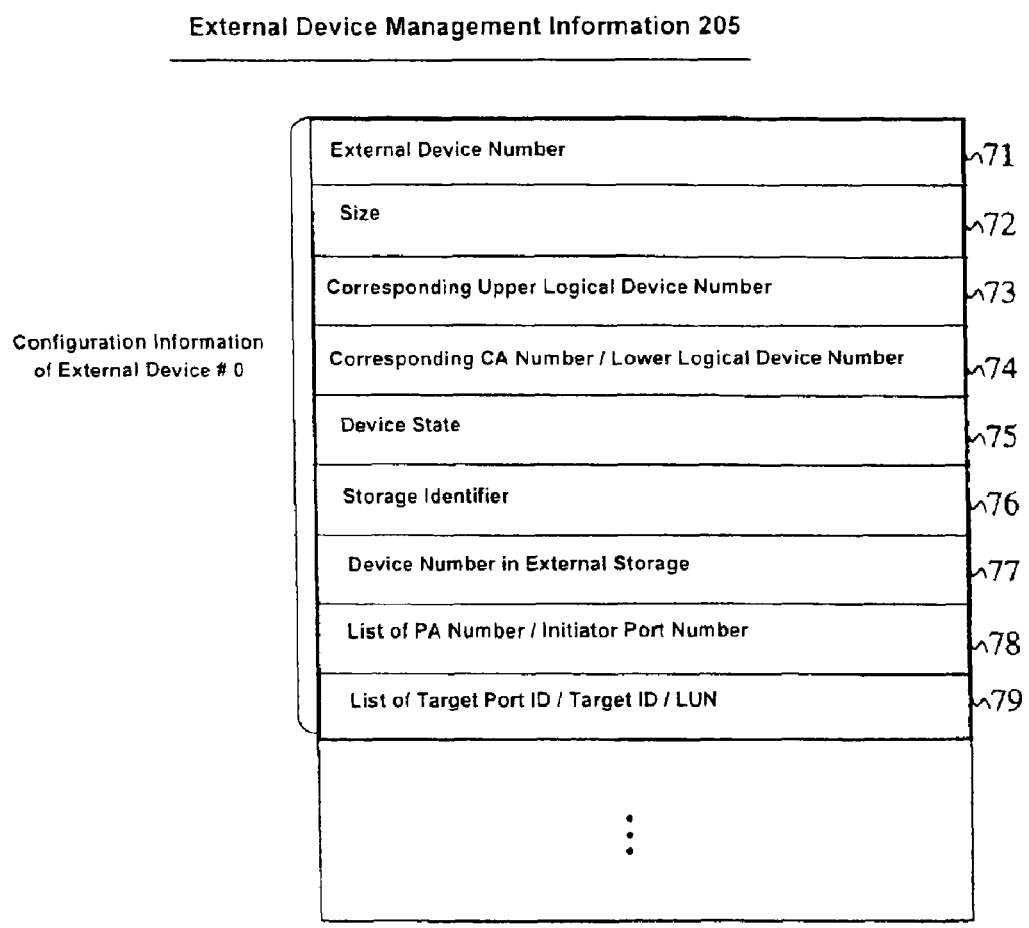
FIG. 7 shows an example of external device management information.

FIG. 7 shows an example of the external device management information 205 for managing devices within the external storage system 180 that is connected to the storage system 130, which are correlated to upper logical devices of the storage system 130 or to both of upper logical devices and lower logical devices. The MA 160 of the storage system 130 retains, for each of the external devices existing within the external storage system 180, a set of information containing External Device Number 71 through List of Target Port ID/Target ID/LUN 79. External Device Number 71 stores a unique value within the storage system 130, which is assigned by the MA 160 of the storage system 130 to each external device. Size 72 stores a capacity of the external device that is specified by the External Device Number 71.

Corresponding Upper Logical Device Number 73 registers a number of an upper logical device within the storage system 130 which is correlated to the external device. Corresponding CA Number/Lower Logical Device Number 74 stores a number of each CA of the storage system 130, which is correlated to the external device and processes access requests from a host to the external device, and a number of a lower logical device that is correlated to the external device. When an upper logical device or a lower logical device is not assigned to the external device, an invalid value is set at the entry 73 or the entry 74.

Device State 75 sets information indicating one of states of the external device. The states may be defined in the same manner as the states for Device State 62 within the physical device management information 202. Since the storage system 130 is not connected to any external device 180 in an initial state, an initial value of Device State 75 is "unmounted." Storage Identifier 76 retains identification information for identifying the external storage system 180 that mounts the external device. As the storage identification information, a combination of a vender's identification information and a manufacturing serial number uniquely assigned to the storage by the vender may be used. Device Number in External Storage 77 stores a device identification number which is assigned to each external device by the external storage system 180 on which the external device is mounted. It is noted that, since the external device is a logical device of the external storage system 180, and therefore the entry 77 stores a logical device number of the external storage system 180.

List of PA Number/Initiator Port Number 78 stores an identification number of any of the ports 141 of the storage system 130 which can access the external device, and an identification number of PA 140 to which the ports belong. When the external device can be accessed from a plurality of ports 141, a plurality of port identification numbers and a plurality of PA identification numbers are registered at the entry 78.

When the external device is defined with LUN to correlate to one or more ports 181 of the external storage system 180, List of Target Port ID/Target ID/LUN 79 retains one or a plurality of port IDs of these ports 181 and one or a plurality of target ID/LUN to which the external device is assigned. When a PA 140 of the storage system 130 accesses an external device (when a PA 140 transmits an input/output request to an external device), Target ID and LUN assigned to the external device by the external storage system 180 to which the external device belongs are used as information to identify the external device.

Next, referring back to FIG. 2, information and programs stored in the memory 143 within PA 140, the memory 153 within CA 150, the memory 163 within MA 160 of the storage system 130, and information and programs stored in the memory 193 within ST 190 are described.

The control information stored in the control memories 155 and 164 within the CA 150 and the MA 160 can be referred to and updated from the control processor within each CA 150, PA 140 and MA 160. However, in this case, accesses through the internal network 170 or the like are necessary. Accordingly, to improve the processing performance, copies of control information necessary for processings that are executed by each of the control processors are retained in the memories of the relevant sections (i.e., CA, PA or MA). When control information managed by any of the sections is updated due to a configuration change, the relevant section notifies the same to the other sections through the internal network 170, and the latest information is provided from the control memory of the relevant section to the memories of the other sections. It is noted that, when control information is updated at one section, any one of other methods may be used to notify such an update to the other sections. For example, a flag may be provided on a control memory of each of the sections to indicate whether an update is made for each configuration information retained in the control memory, and each of the control processors in the respective sections may refer to the flag to check if any update has been made, each time a processing is started or each configuration information is referred to.

It is noted that control programs that operate on the control processors in the respective sections are stored in the respective memories of the corresponding sections, in addition to the copies of the control information described above.

In the present embodiment, methods for controlling the storage system 130 and the external storage system 180 are described below, using as examples a processing to define external devices existing within the external storage system 180 as logical devices of the storage system 130, in other words, a processing to define logical devices and LU paths, and a processing to process input/output requests from the host computer to the logical devices of the storage system 130 including the external devices thus defined.

At least the following control information and programs are stored in the memory of each of the respective sections for the processings described above. The memory 143 of the PA 140 stores a copy 214 of the upper logical device management information, a copy 215 of the external device management information, a copy 216 of the LU path management information, a request switching program 251, an external device (logical device) definition program 253, and an LU path definition program 252. The memory 153 of the CA 150 stores a copy 211 of the lower logical device management information, a copy 212 of the physical device management information, a copy 215 of the external device management information, a command processing program 254, a logical device definition program 255, an asynchronous destaging program 257, and an external device path reconfiguration program 256. The memory 163 of the MA 160 stores a copy 210 of the entire device management information (in other words, the upper logical device management information, lower logical device management information, physical device management information, and external device management information), a logical device definition program 255, an LU path definition program 252, an external device definition program 253, and an external device path reconfiguration program 256. The memory 193 of ST 190 stores a copy 210 of the entire device management information, a logical device definition program 255, an LU path definition program 252, and an external device definition program 253.

Next, the storage control processing that operates in each of the sections is described. A processing in which internal devices that are physical devices existing within the storage system 130 and devices including external devices existing within the external storage system 180 are assigned to a specified host computer 100 to allow the host computer 100 to use these devices may be generally divided into three processings, i.e., an external device definition processing 253, a logical device definition processing 255 and an LU path definition processing 252. (It is noted that, in the present embodiment, each of the processings described herein is assigned the same reference number as that of each of the specific programs that perform the corresponding processings.)

Figure 8:
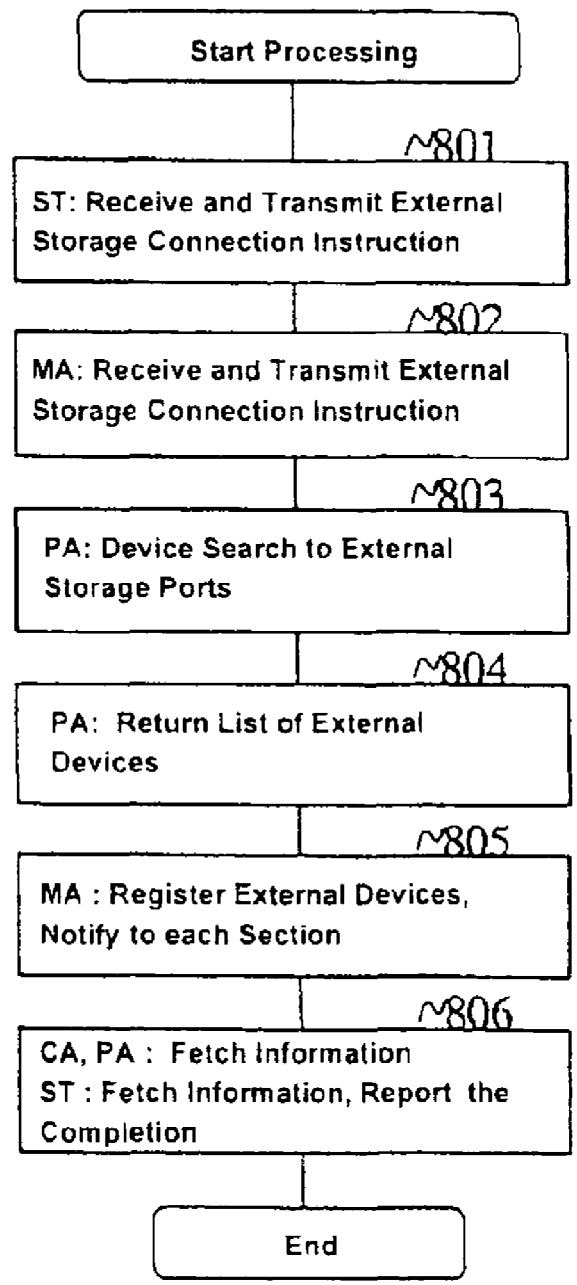
FIG. 8 shows an example of an external device definition processing.

FIG. 8 shows an example of a processing flow of the external device definition processing 253. The external device definition processing 253 is a processing to introduce devices within the external storage system 180 as external devices under the management of the storage system 130.

First, the ST 190 receives a external storage connection instruction to connect to external storage systems 180 sent from a storage management administrator or the management server 110, and transmits the connection instruction to the MA 160 (step 801). The connection instruction includes information that specifies the external storage systems 180 to be connected, for example, WWNs of ports 181 of the external storage systems 180 or device identification information obtained from responses to Inquiry command sent to the external storage systems 180, or both of the above, and numbers of ports 141 of the storage system 130 to be connected to the external storage systems 180.

The MA 160 receives the external storage connection instruction, and transmits, to all of the PAs 140 that correspond to the numbers of the ports 141 appended to the connection instruction, the external storage connection instruction having the information to identify the external storage systems and the numbers of the ports to be connected to the external storage systems (step 802).

Each PA 140, that received the external storage connection instruction from the MA 160, searches for the external devices 180 to be connected, using the identification information for identifying the external storage systems 180 appended to the connection instruction (step 803). More specifically, when the PA 140 is given the WWNs of the ports 181 from the MA as the external storage identification information, the PA 140 transmits Inquiry command to all LUNs of the ports 181 of the external storage systems from the ports 141 designated by the port numbers appended to the connection instruction, and puts LUNs that returned normal responses to Inquiry command as external device registration candidates. When the PA 140 is given only the device identification information from the MA 160 as the external storage identification information, the PA 140 transmits Inquiry command for all LUNs to node ports (which have already been detected at the time of node port login) of the external storage systems 180 detected by each of all the ports 141 of the PA 140. For the devices (LUNs) that returned normal responses to Inquiry command, the PA 140 compares device identification information contained in the normal responses with the values appended to the connection instruction, and puts those of the devices that match the values as external device registration candidates.

Then, each PA 140 returns to the MA 160 a list of information for the detected external device registration candidates (step 804). The list of information contains information necessary for setting the external device management information 205 for each of the external device registration candidates.

The MA 160 numbers the external devices included in the received list of information (for the external device registration candidates), and registers the device information in the external device management information 205, and notifies to the other sections of the fact that the device information has been updated (step 805). More specifically, the information that is registered by the MA 160 in the external device management information 205 in step 805 may include External Device Number 71 that the MA 160 assigned to the external devices, Size 72 that is obtained from responses to Inquiry command, Storage Identifier 76 and Device Number In External Storage 77, and List of PA Number/Initiator Port Number 78 and List of Target Port ID/Target ID/LUN 79 to be notified from the PA 140 to the MA 160. Also, the MA 160 sets invalid values that are initial values at entries of Corresponding Upper Logical Device Number 73 and Corresponding CA Number/Lower Logical Device Number 74 as they have not yet been assigned. Further, a state "off line" is set at the entry of Device State 75.

Each CA 150 and PA 140, which received the update notification of the external device management information 205, reads the external device management information 205 stored in the control memory 164 of the MA 160 onto their respective memories. Also, the ST 190 fetches the external device management information 205 to its memory, and outputs a completion notification to notify the completion of the external device definition processing to the storage management administrator or the management server 110 which is the request source of the external device definition processing (step 806).

The present embodiment uses a configuration in which the storage management administrator or the management server 110 gives a connection instruction to the storage system 130, and also designates target external storage systems 180 to be introduced. However, the storage management administrator or the management server 110 may give to the storage system 130 only a connection instruction to connect to the external storage system 180, and the storage system 130 may register all devices of all the external storage systems detected from all the ports 141 as external devices. Alternatively, the storage management administrator or the management server 110 may not give any particular express connection instruction, and the storage system 130 may register all devices detected as external devices at a moment when the external storage system 180 is connected to the storage system 130.

Figure 9:
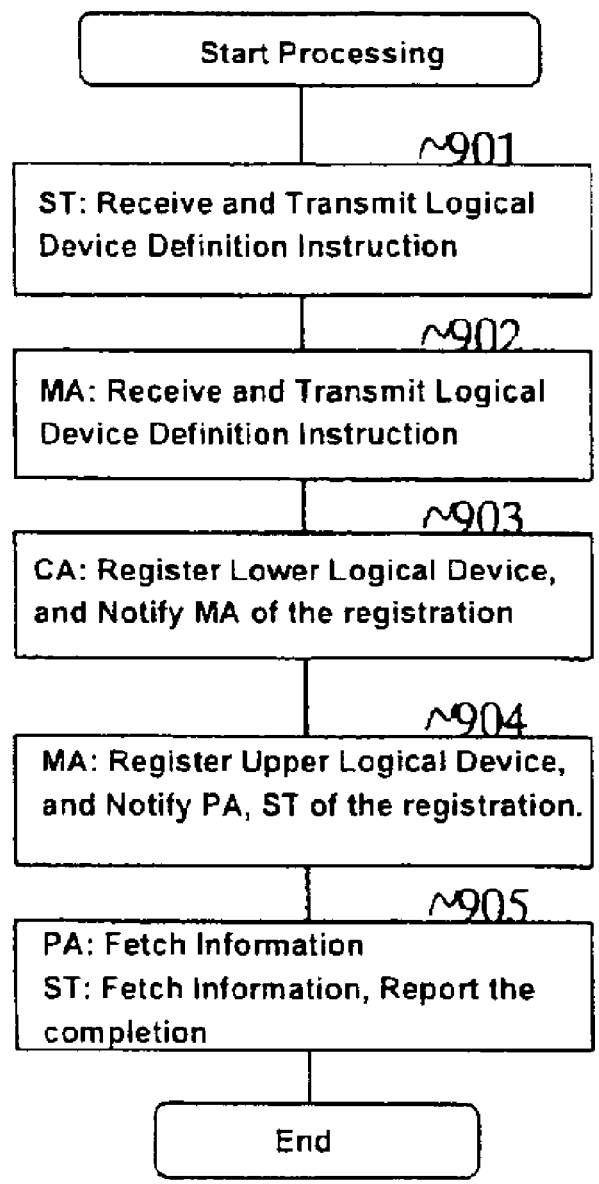
FIG. 9 shows an example of a logical device definition processing.

FIG. 9 shows an example of a processing flow of the logical device definition processing 255. The logical device definition processing 255 is a processing that is performed upon receiving an instruction from the storage management administrator or the management server 110 to define upper and lower logical devices for the physical devices mounted on the storage system 130 or the external devices that are defined by the external device definition processing 253.

Upon receiving a logical device definition instruction from the storage management administrator or the management server 110, the ST 190 transmits the instruction to the MA 160 (step 901). Numbers of the target physical devices or external devices to which the logical devices are assigned, numbers of upper logical devices to be assigned, numbers of lower logical devices to be assigned, and numbers of CAs that manage the lower logical devices are appended to the logical device definition instruction. In the present embodiment, it is assumed that one logical device is assigned to one physical device or one external device, for the sake of simplification of description. However, in other embodiments, one logical device may be assigned to a device group composed of two or more physical devices or external devices; or two or more logical devices may be assigned to one physical device or one external device; or two or more logical devices may be assigned to a device group composed of two or more physical devices or external devices. However, in each of the cases, information indicating the starting position and size of each logical device within each physical device or external device needs to be appended to the lower logical device management information 201, and the entry at Corresponding Physical/External Device Number in the lower logical device management information 201 needs to accommodate a plurality of devices, and the entry at Corresponding Lower Logical Device Number in each of the physical device management information 202 and the logical device management information 205 need to accommodate a plurality of devices.

Upon receiving the logical device definition instruction, the MA 160 specifies a target CA 150 based on the information appended to the logical device definition instruction, and transmits the logical device definition instruction to the specified CA 150 (step 902).

At the target CA 150, a lower logical device is registered for the designated physical or external device (step 903). More specifically, the target CA 150 registers, for the target device entry of the lower logical device management information 201 (i.e., the entry corresponding to the number of the lower logical device appended to the logical device definition instruction), the lower logical device number appended to the logical device definition instruction at the entry 51, the number of the physical or external device appended to the logical device definition instruction at the entry 53, the size of the lower logical device at the entry 52, and the upper logical device number appended to the logical device definition instruction at the entry 55, and sets a state "on line" at Device State 54. Also, the corresponding CA number and the lower logical device number of the physical or external device is set, and the device state is updated to "on line." When the registration is completed, the CA 150 notifies the MA 160 of the completion.

Next, the MA 160 assigns an upper logical device to the lower logical device designated by the logical device definition instruction, and notifies to the other sections that the control information has been updated (step 904). More specifically, the MA 160 sets, for the device entry of the upper logical device management information 204 (i.e., the entry corresponding to the number of the upper logical device appended to the logical device definition instruction), the upper logical device number appended to the logical device definition instruction at the entry 31, the size of the upper logical device at the entry 32, and the CA number and the lower logical device number appended to the logical device definition instruction at the entry 33, and sets Device State to "off line" at the entry 33. Invalid values are set at the entry 35 and 36 because they have not been assigned. Furthermore, when the logical device is to be assigned to an external device, the external device number appended to the logical device definition instruction is set at the entry 38, Device Access Mode 37 is set at "PA direct" as an initial value. Moreover, when the logical device is to be assigned to an external device, its upper logical device number is set at Corresponding Upper Logical Device Number 73 of the external device management information 205. Then, the MA 160 notifies each PA 140 and ST 190 that the control information has been updated.

Having been notified of the update of the control information, the PA 140 fetches the updated information to the memory 143. Also, having been notified of the update of the control information, the ST 160 fetches the updated information, and outputs to the request source, i.e., the storage management administrator or the management server 110, a completion report to report the completion of the logical device definition processing (step 905).

Figure 10:
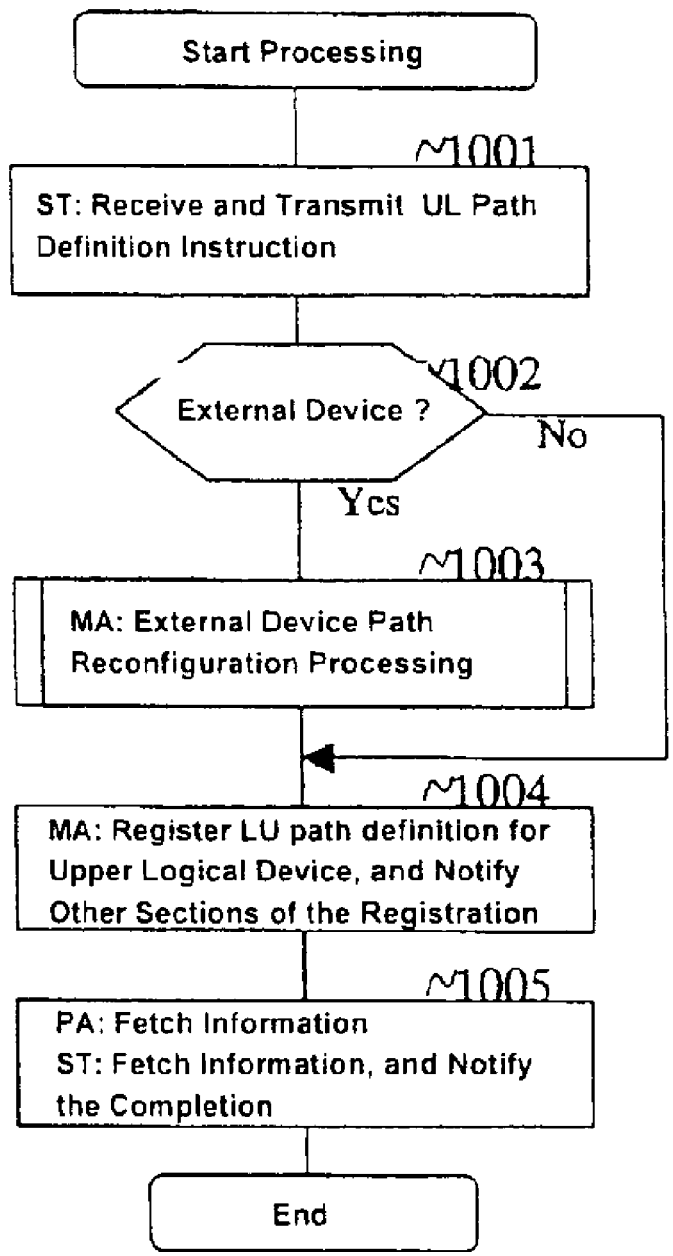
FIG. 10 shows an example of an LU path definition processing.

FIG. 10 shows an example of a processing flow of the LU path definition processing. When the ST 190 receives an LU path definition instruction from a storage management administrator or the management server 110, the ST 190 transfers the same instruction to the MA 160 (step 1001). The LU path definition instruction is appended with the number of a port 141 and an LUN that define the target upper logical device number and an LU, as well as identification information of the host 100 (e.g., WWN of the port 107 of the host 100) that accesses the LU and a request function level to the upper logical device.

As the request function level, a data linkage function such as data replication, device rearrangement or the like, applicability of a function to increase access speed using a cache resident access through storing data on a cache, and the like may be designated. The request function level may simply designate information indicating whether or not the upper logical device needs a process via the CA 150.

The MA 160 judges based on the entry 38 in the upper logical device management information 204 relating to the upper logical device designated in the LU path definition instruction as to whether or not the device is an external device (step 1002), and performs an external device path reconfiguration processing (step 1003) when the device is an external device.

When the external device path reconfiguration processing is completed, or when the upper logical device designated in the LU path definition instruction is not correlated to an external device, the MA 160 registers a LU path for the upper logical device (step 1004). More specifically, the MA 160 sets the relevant information designated in the LU path definition instruction at Port Number, Target ID, LUN 35 and Accessing Host Name 36 of the corresponding device entry in the upper logical device management information 204, and sets the configuration information starting with Target ID/LUN 41 at free entries of the LU path management information 206 for the port designated in the LU path definition instruction, according to the LU path definition instruction.

When the registration and settings are completed, the MA 160 notifies the other sections of their completion. Upon receiving the notification, the PA 140 fetches the newly set and registered information. Upon receiving the notification, the ST 190 fetches the newly set and registered information, and outputs to the request source, i.e., the management server 110 or the storage management administrator, a completion report to notify the completion (step 1005).

Figure 14:
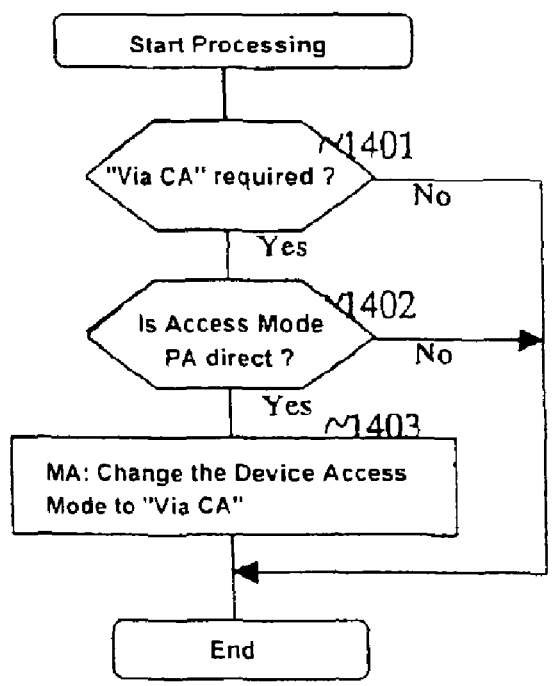
FIG. 14 shows an example of an external device connection changing processing.

FIG. 14 shows an example of a processing flow of the external device path reconfiguration processing 256. In the first embodiment, when an LU path definition is made for an upper logical device corresponding to an external device, and when it is determined that the external device requires an input/output processing via the CA 150 to be performed based on a function level requested by a storage management administrator, the external device path reconfiguration processing 256 is executed in order to switch the connection configuration from the PA direct connection that is an initial state.

First, the MA 160 checks the request function level to the device, which is appended to the LU path definition instruction, and judges as to whether input/output processings via the CA 150 are necessary (step 1401).

When a data linkage function such as data replication, data rearrangement or the like, a function using disk cache such as cache resident access, or the like are set as the request function level, or the request function level designates that direct processings via the CA 150 are required, a determination is made that input/output processings via the CA 150 are necessary. If necessary, when the state "PA direct" is currently registered at Device Access Mode 37 of the upper logical device management information 204 (step 1402), the state at Device Access Mode 37 for the relevant device is changed to "Via CA" (step 1403). When it is judged that input/output processings via the CA 150 are not necessary, or when it is judged that input/output processings via the CA 150 are necessary, but Device Access Mode 37 is currently set at "Via CA", no change is made to Device Access Mode 37.

Through the processings described above, the external device can be registered within the storage system 130 as an upper logical device that is managed by the storage system 130.

Next, a description is made as to a method of processing input/output requests received from the host 100 in a state in which the external device is provided to the storage system 130 as an upper logical device. The method is basically composed of three processings, i.e., a request switching processing performed at the PA 140, and a command processing and an asynchronous destaging processing performed at the CA 150. These processings are described one by one below.

Figure 11:
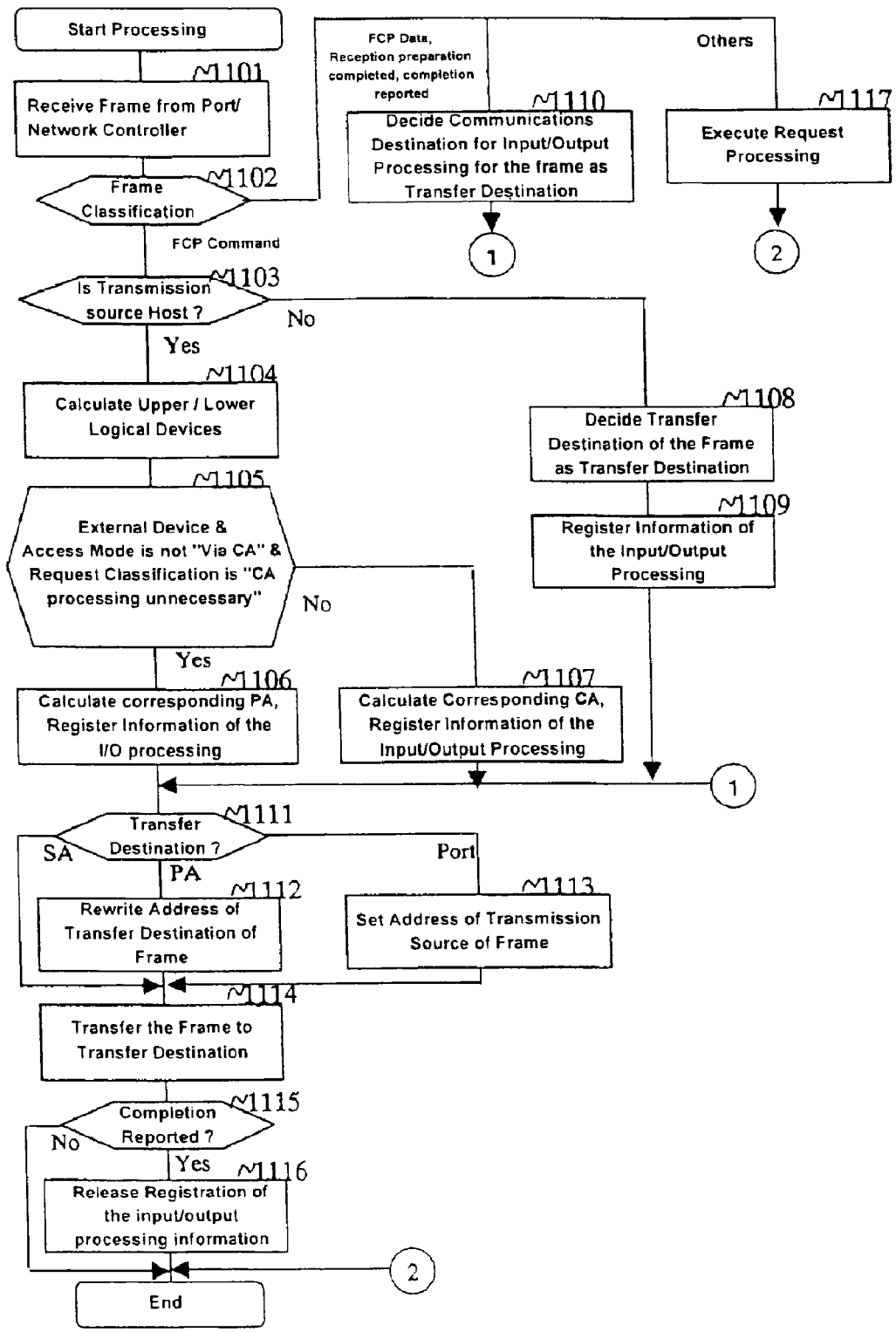
FIG. 11 shows an example of a request allocation processing.

FIG. 11 shows an example of a processing flow of a request switching processing 251. The request switching processing 251 is a processing to switch input/output requests and data received at the port 141 in the PA 140 from the host 100 or the external storage system 180, and input/output requests and data received at the network controller 144 from the CA 150 or another PA 140 to appropriate target sections, such as, the CA 150 or another PA 140, or the host or the external storage system 180, respectively. In the request switching processing 251, when a command frame is received, the device management information is referred to, and a transfer destination of the frame is decided; and then, for transfer control of data frames that are exchanged in input/output processings (which correspond to "exchange" in the fibre channel) that are started by the command, routing control information for the input/output processings is registered. The routing control information is independently managed by each PA 140, and retains identification information for each input/output processing (which corresponds to "exchange ID" that is stored at a frame header in the case of the fibre channel), information for a request source section and its address, information for a request destination section and its address, and the like. As the addresses of the request source and the request destination, source ID and destination ID included in header information of the command frame and LUNs are used in the case of the fibre channel. It is noted that, since the host 100 accesses the external device and the physical device existing within the storage system 130 as devices that are managed by the storage system 130, the external device and the physical device are accessed from the host 100 as a LUN of the port 141. Accordingly, the header information of the command frame received from the host sets a port ID of the port 141 as the destination ID and an LUN at the port 141 as the LU.

When the PA 140 receives the command frame from the host, and accesses are made in the "PA direct" mode, the PA 140 registers the number of corresponding PA 140 (in other words, the PA 140 having a port that is connected to the external storage system having the external device), the number of the port 141 that is connected to the external storage system 180, the port ID of the port 181 of the external storage system 180, and the LUN of the external device to be accessed at the port 181 in the routing control information as request destination information.

When accesses are made in the "Via CA" mode, the PA 140 registers the identification number of the CA 150 through which accesses are made, and the lower logical device number that is correlated to the upper logical device indicated by the header information of the command frame in the routing control information as request source information.

It is noted that the routing control information also registers routing information for input/output requests from the CA 150, such as, input/output requests to the external device. In this case, as transmission source information for the input/output requests, the number of the CA 150 and identification information that specifies the command processing 254 operated on the CA 150 are retained.

When the PA 140 receives a fibre channel frame including data and commands from the port 141 or the network controller 144 (step 1101), the PA 140 separates the processing according to the classification of the frame (step 1102). The classification of the frame can be determined based on data included in the frame.

When the frame is an FCP command frame, the processing is separated depending on the transmission source of the frame (step 1103). In the present embodiment, the command frame may be received through two paths, i.e., one from the host 100 through the port 141, and the other from the CA 150 that accesses the external storage system 180 or from another PA 140 through the network controller 144.

First, when the transmission source is the host, based on the LUN indicating the upper logical device to be accessed and included in the header information of the received frame, the PA 140 refers to the LU path management information and the upper logical device management information, and judges if the upper logical device is correlated to the external device, and the device access mode is not "Via CA", in other words, the device access mode is "PA direct" in the first embodiment. If the upper logical device is correlated to the external device and the device access mode is "PA direct", a further determination is made if the request classification of the command is "CA processing unnecessary." If all of the conditions above are met, a determination is made that the access configuration of the request is "PA direct," and a determination is made that the access configuration of the request is "Via CA" in cases other than the above (step 1104-1105).

In the case of "PA direct" accesses, upon receiving the FCP command frame, the PA 140 refers to the upper logical device management information 204 and the external device management information 205, obtains the identification number of PA 140 that is connected to the external storage system 180 having the external device, and identification information of the external device within the external storage system 180, such as target port ID, target ID, LUN and the like of the external device, and registers routing control information for the command with these values as the request destination of the input/output processing, and the transmission source of the frame as the request source of the input/output processing (step 1106).

In the case of "Via CA" accesses, the PA 140 refers to the upper logical device management information 204, and calculates a CA number corresponding to the upper logical device that is the access target of the received command frame, and registers routing control information for the command with the aforementioned value as the request destination of the input/output processing, and the transmission source of the frame as the request source of the input/output processing (step 1107).

In the meantime, in the separating processing in step 1103, when the transmission source of the command frame is determined to be a section other than the host 100, in other words, it is the CA 150 or another PA 140, the PA 140 determines that an external device of the external storage system 180 designated in the header information of the command frame is a transfer destination, and registers routing control information for the command with the aforementioned value as the request destination of the input/output processing and the transmission source of the frame as the request source for the input/output processing (step 1108, 1109).

In the mean time, in the separation processing in step 1102, when the classification of the frame received at the PA 140 is determined to be a data frame, a transfer ready frame or a completion report frame, the PA 140 refers to the routing control information for input/output processings corresponding to the frame, and determines that a communications destination for the section of the transmission source of the frame as a transfer destination of the frame. In other words, when the PA 140 receives the frame from the external storage system 180, a determination is made that another PA 140 or the CA 150 that is connected to the host 100 that is the request source for the input/output processing is the transfer destination of the frame; and when the PA 140 receives the frame from the host 100, a determination is made that the CA 150 that is the request destination for the input/output processing or another PA 140 that is connected to the external storage system 180 is the transfer destination of the frame. Furthermore, when the PA 140 receives the frame from the CA 150 or another PA 140, a determination is made that the host 100 or the external storage system 180 that is a communications destination for the input/output processing (in other words, the request destination, when the transmission source of the frame is the request source of the input/output processing) is the transfer destination of the frame (step 1110).

When the transfer destination of the received frame is determined, the PA 140 separates the processing depending on the transfer destination section (step 1111). When the transfer destination is another PA 140, the address of the transfer destination registered in the routing control information of the input/output request is set at the transfer destination address of the frame (step 1112). In other words, when the transfer destination is the external device, the destination ID of the received frame is rewritten to the target port ID (in other words, the port ID of the port 181) of the external device which is registered as the request destination of the input/output processing in the routing control information, and the address information such as LUN in the frame is rewritten to the address of the external device (in other words, LUN or the like obtained through referring to the external device management information); and when the transfer destination is the host 100, the destination ID of the received frame is rewritten to the port ID of the port 107 of the host 100 which is registered as the request source of the input/output processing in the routing control information.

Also, when the transfer destination is the host 100 or the external storage system 180 that is connected to the port 141 within the PA 140, the address of the port 141 is set to the transmission source address of the frame (step 1113).

Then, upon having receiving the commands, data, transfer ready and completion report frame, the PA 140 transfers the frame to the host 100, or the external storage system 180, or the CA 150, or the PA 140, which is the transfer destination determined (step 1114). Furthermore, when the frame whose transfer has been completed is a completion report frame, the registration of the routing control information for the input/output processing is released (step 1115, 1116).

Also, when the frame received by the PA 140 is not a FCP-related frame, the control processor 142 of the PA 140 that received the frame executes a known processing as a node port of the fibre channel (step 1117).

If, as a result of the execution of the request switching processing, the transfer destination of the command frame is determined to be CA 150, the frame and other information such as the target CA number to be accessed, lower logical device number, LBA and size appended thereto are transfer to the CA 150 of the transfer destination. Also, when a data frame that follows the command frame is to be transferred to CA 150, the network controller of each of the respective PA 140 and CA 150 performs data transfer with awareness of the already established command sequence.

Figure 12:
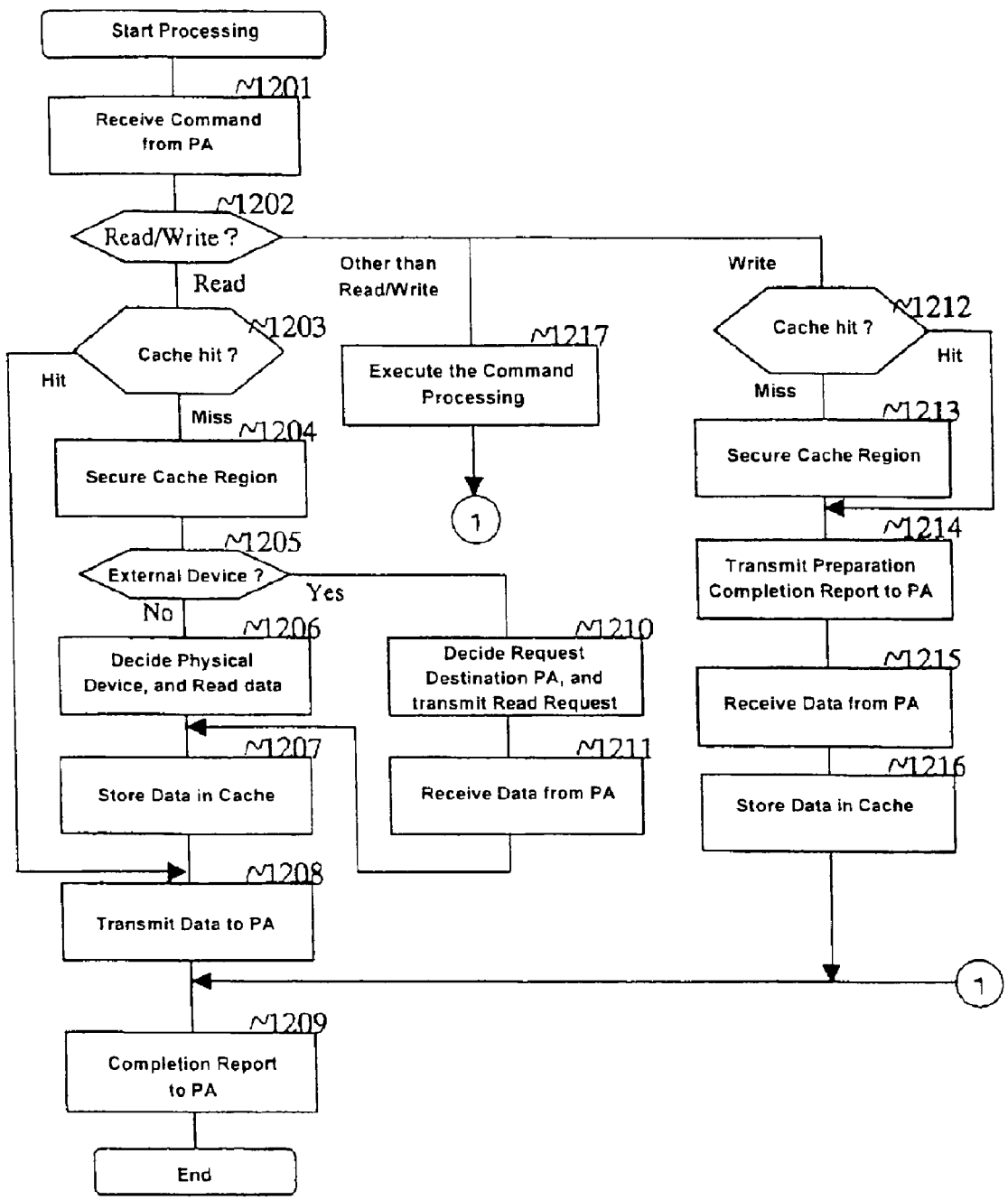
FIG. 12 shows an example of a command processing.

FIG. 12 shows an example of a processing flow of a command processing 254. The command processing 254 is a processing to process input/output requests to the lower logical device at CA 150.

As a result of the request switching processing 251, the command classification is checked for the FCP command received at the CA 150 (step 1202). When the request of the FCP command is a read request, a determination is made by referring to the cache management information 203 as to whether data to be read is hit on the disk cache (stored in the cache) 154 (step 1203); and if it is hit, data transmission to the PA 140 is started in step 1208.

In the case of cache miss, the cache management information 203 is updated to allocate a region on the disk cache 154 (step 1204), and a staging from a physical device or an external device that stores the data to the cache is executed. The CA 150 can decide, by referring to the lower logical device management information 210, as to whether the device that stores the read data is a physical device or an external device (step 1205).

If the device that stores the read data is a physical device, the CA 150 issues a read request to the disk device 157 specified by the physical device management information 202 and reads the data (step 1206), and stores the data read in the region allocated on the disk cache 154 (step 1207).

If the device that stores the read data is an external device, the CA 150 refers to the external device management information 205 and specifies a target PA 140 to be accessed from the entry 78, and transmits to the target PA 140 a read request to the external device (step 1210). Upon receiving the read request, the PA 140 transmits to the external device the read request through the request switching processing 251. The PA 140 receives the read data from the external storage system 180 as a response, and returns to the CA 150 the read data received from the external storage system 180. The CA 150 stores the read data received from the PA 140 in the region secured on the disk cache 154 (step 1211, 1207).

When the read data is stored on the disk cache 154, the CA 150 transmits the data stored on the disk cache 154 to the PA 140 that is the transmission source of the FCP command frame (step 1208); and the PA 140 transfers the data to the host through the request switching processing 251.

When the FCP command frame received from the PA 140 requests write data, the CA 150 judges whether or not old data corresponding to the write data is stored on the disk cache 154 (1212), and allocates a region on the disk cache 154 in the case of cache miss (1213).

Next, the CA 150 transmits a transfer ready to the PA 140 that is the transmission source of the FCP command frame (step 1214). Upon receiving the transfer ready, the PA 140 transfers to the host 100 the transfer ready through the request switching processing 251. When the write data is sent from the host, the PA 140 transmits the data to the CA 150. The CA 150 stores the write data received from the PA 140 onto the region secured on the disk cache 154 (step 1215, 1216).

Also, when the command received at the CA 150 is neither a read command or a write command, for example, when the command is a sense command such as a mode sense command or a diagnose command, an appropriate processing is executed based on the specification of general SCSI storage (step 1217).

The CA 150 reports to PA 140 that is connected to the host 100, and the PA 140 transmits a completion report frame to the host 100 through the request switching processing 251 (step 1209).

Figure 13:
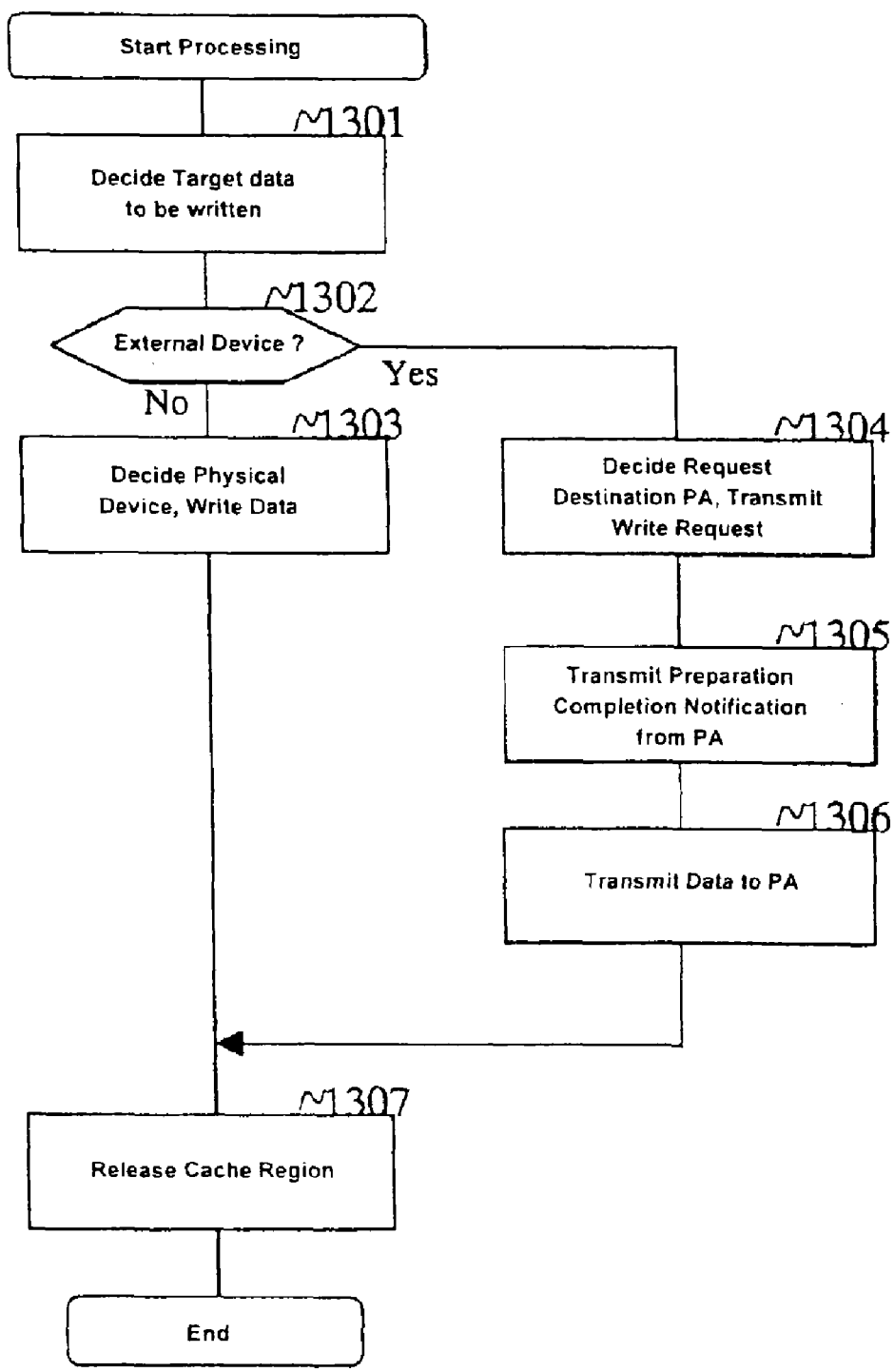
FIG. 13 shows an example of a write-after processing.

FIG. 13 shows an example of a processing flow of an asynchronous destaging processing (i.e., write-after processing) 257. The asynchronous destaging processing 257 is a processing that is executed as a result of the command processing 254 by the CA 150 to write out write data stored on the disk cache 154 onto the disk device 157. The write data retained on the disk cache 154 is managed by the cache management information 203. Normally, write data or read data read from a disk is managed by a queue so that older data among the data are sequentially expelled from the disk cache 154.

The CA 150 selects data that is to be actually written in the disk among the data managed by the conventional known method described above (step 1301), and judges, based on the lower logical device management information 201, whether the disk that stores the data is correlated to an external device or a physical device (step 1302).

When write data is written in a physical device, the CA 150 refers to the physical device management information 202 to specify a disk in which the data is to be written, and writes the write data in the specified disk (step 1303).

On the other hand, when write data is written in an external device, the CA 150 refers to the external device management information 205 to specify PA 140 that is connected to the external storage system having the external device in which the write data is written, and transmits a write request to the PA 140 (1304). Upon receiving the write request, the PA 140 transfers the write request to the external storage system 180 through request switching processing 251, and then the PA 140 receives a transfer ready from the external storage system 180 as a response to the write request. Then the PA 140 transfers the transfer ready to the CA 150 that is the transmission source of the write request. Upon receiving the transfer ready, the CA 150 transmits the write data to the PA 140 (step 1305, 1306). Upon receiving the write data, the PA 140 transmits the write data to the external storage system 180 through the request switching processing 251, and the external storage system 180 writes the write data in the external device.

After wiring the write data in the physical device or the external device, the CA 150 releases the region that stored the write data on the disk cache (step 1307).

Figure 15:
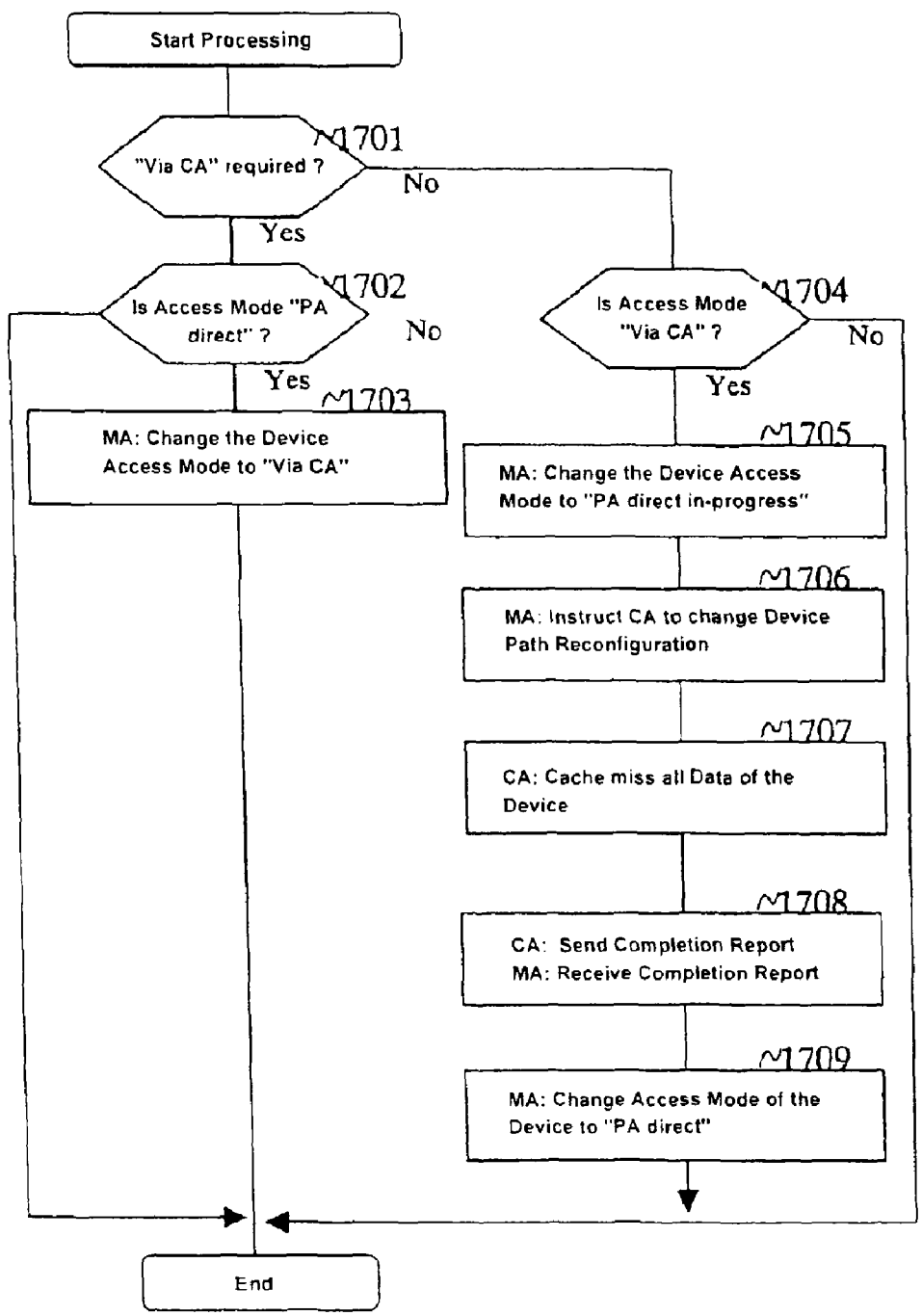
FIG. 15 shows another example of an external device connection changing processing.
Figure 16:
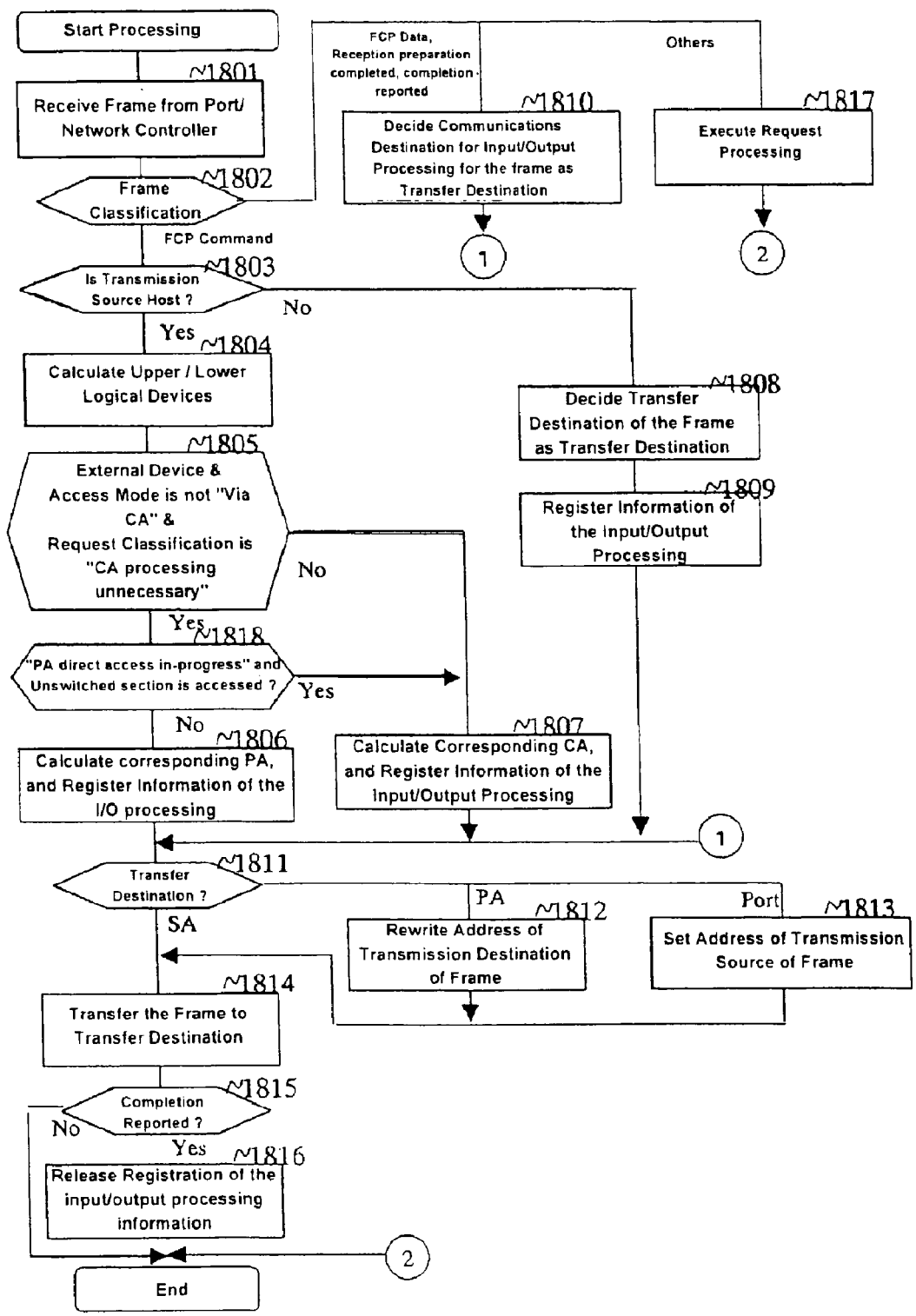
FIG. 16 shows another example of a request allocation processing.

Next, referring to FIGS. 15 and 16, a second embodiment of the present invention is described.

In the second embodiment, a connection configuration that is once determined at the time of an LU path definition operation (in other words, PA direct or via CA) for an upper logical device corresponding to an external device is switched according to later changes in the function request level of the device. It is noted that, even when the connection configuration is switched, input/output requests to the upper logical device from the host are continuously received.

It is noted that the second embodiment has generally the same hardware and software as those of the first embodiment, and therefore only differences between them will be described.

Referring to FIG. 3, an upper logical device management information 204 in accordance with the second embodiment is described. The second embodiment differs from the first embodiment in that a value "PA direct in-progress" is added to Device Access Mode 37, in addition to the values "PA direct" and "Via CA." The value "PA direct in-progress" indicates a transitional state in which the external device connection configuration is switched from "Via CA" to "PA direct," in other word, a switching processing to be described below is being executed at the corresponding CA 150. Also, in the second embodiment, a reconfiguration management pointer 39 is added to the upper logical device management information 204 in the first embodiment. This pointer is used when the upper logical device is in the state of "PA direct in-progress," and is information indicating a head address of a region where a processing to switch the connection configuration with respect to external sections is not completed. The reconfiguration management pointer 39 is updated according to the progress of a cache miss processing at the CA 150 to be described below.

Referring to FIG. 5, an example of the composition of the lower logical device management information 201 in accordance with the second embodiment is described. In the second embodiment, a reconfiguration management pointer 56 is added to the lower logical device management information 201 in the first embodiment. Details of the reconfiguration management pointer 56 may be the same as those of the upper logical device management information 204 described above. The reconfiguration management pointer 56 is also updated according to the progress of a cache miss processing at the CA 150.

The reconfiguration management pointers are managed in duplicate by the upper logical device management information and the lower logical device management information, such that the frequency of updates to the upper logical device management information 204 retained by the MA 160 can be lowered. When the upper logical device management information 204 is updated, all the PAs 140 within the storage system 130 need to fetch updated information into the memories 143. Therefore, the reduction in the frequency of updates to the upper logical device management information 204 is effective in maintaining the performance of the storage system 130.

However, if update information is not immediately reflected on each PA 140 when the upper logical device management information 204 is updated, each PA 140 would refer to an old reconfiguration management pointer 39 in an input/output request switching processing. Therefore, the PA 140 may transfer to the CA 150 an input/output request even for a region where a cache miss processing has been completed. Therefore, in the command processing 254 by the CA 150, a write request to a region where a cache miss processing has been completed is not processed by an asynchronous destaging processing, but may be immediately written in a physical device or an external device, such that the disk cache 154 that is used by the cache miss processing can be released as quickly as possible after the cache miss processing.

FIG. 15 shows an example of a processing flow of an external device path reconfiguration processing 256 in accordance with the second embodiment of the present invention. The external device path reconfiguration processing is executed by the MA 160, when an upper logical device corresponding to an external device is assigned to the host 100, and LU paths are defined, and when the MA 160 receives an instruction to change the function request level for an upper logical device through the ST 190 from a storage management administrator or the management server 110.

When the MA 160 receives an instruction to change the function request level, the MA 160 judges, based on the instruction, as to whether or not the connection configuration of an upper logical device specified by information in the instruction should be "Via CA" (step 1701). When the connection configuration should be "Via CA," the MA 160 judges, by referring to the upper logical device management information 204, as to whether or not the Device Access Mode of the upper logical device is currently set to the "PA direct" mode (step 1702). When it is at the "PA direct" mode, the MA 160 needs to change the connection configuration of the upper logical device from "PA direct" to "Via CA." Processings performed in this case are the same as the processings indicated in FIG. 14 of the first embodiment (step 1703). When the connection configuration is already in the "Via CA" mode, no change is required and the processing thus ends.

In step 1701, when the connection configuration of the upper logical device should be in the "PA direct" mode, the MA 160 judges, by referring to the upper logical device management information 204, as to whether the Device Access Mode of the upper logical device is currently set at the "Via CA" mode or at the "PA direct" mode (step 1704).

When the Device Access Mode is set at the "Via CA", the MA 160 needs to change the connection configuration from "Via CA" to "PA direct." In this case, the MA 160 first changes the entry at the Device Access Mode 37 in the upper logical device management information 204 for the upper logical device to "PA direct in-progress" (step 1705), and specifies CA 150 that manages a lower logical device correlated to the upper logical device by referring to the upper logical device management information 204. Then, the MA 160 notifies the specified CA 150 that the connection configuration of the upper logical device is changed from the "Via CA" mode to the "PA direct" mode (step 1706).

When notified of the change, the CA 150 searches the disk cache 154 for the entire data of the corresponding lower logical device, and executes a cache miss operation for the disk cache 154, in other words, data that has not been updated in a physical device or an external device is written from the disk cache 154 to the corresponding device to update data within the device, and then a cache region allocated to the updated data is immediately released. The search is conducted, using the cache management information 203, successively from the head of the lower logical devices, and the progress of the completed search and cache miss processing is managed by advancing the reconfiguration management pointers of the upper logical device and lower logical device management information (step 1707).

When the cache miss processing for the entire region on the disk cache is completed, the CA 150 reports the same to the MA 160 (step 1708), and the MA 160 changes the entry at Device Access Mode 37 in the upper logical device management information 204 to "PA direct" and completes the external device path reconfiguration processing.

FIG. 16 shows an example of a processing flow of a request switching processing 251 in accordance with the second embodiment. Compared with the request switching processing in the first embodiment shown in FIG. 11, in the request switching processing 251 in the second embodiment, when the fibre channel frame received is an FCP command frame, the transmission source is the host, the command target device is an external device, and the access mode is not "Via CA" and the request classification of the command is "CA processing unnecessary," a step (step 1818) is further added. In step 1818, a determination is made as to whether the access mode is "PA direct in-progress," and an access region indicated by the LBA within the command and the block number is located after the reconfiguration management pointer 39 of the upper logical device. When the access mode is not "PA direct in-progress," or the command received by the PA 140 is before the reconfiguration management pointer 39, in other words, the command targets at a region where the access mode has been switched to "PA direct," the access destination is determined to be PA 140 that is connected to the external storage system 180 having the external device (step 1806); if not, in other words, when the access mode is "PA direct in-progress" and the access destination is a region where the access mode has not been switched, the command frame is transferred to CA 150 (step 1807).

The present invention is not limited to the particular embodiments described above, and many modifications can be made. For example, in the present embodiments, even when the access mode of an upper logical device that is correlated to an external device is "PA direct", the CA 150 processes commands received if the commands are diagnose or sense commands. However, instead of the CA 150, the processor 162 of the MA 160 may process these commands. In this case, as described in the present embodiments, all external devices may be directly assigned to upper logical devices without assigning them to the CA 150 and lower logical devices.

Also, for example, in the present embodiment, the host 100, the storage system 130 and the external storage system 180 are mutually connected via a fibre channel. However, they may be connected by an IP network using SCSI protocol as an upper protocol. In this case, a network between the host 100 and the storage system 130 and a network between the storage system 130 and the external storage system 180 may use different kinds of network.

Also, when the external storage system 180 is a device without redundancy such as JBOD as indicated in FIG. 17, a RAID may be structured with a plurality of external devices at the CA 150 of the storage system 130. However, in such a case, in the stage in which logical devices are defined, the access mode for the upper logical devices needs to be set as "Via CA," and the correlation of a plurality of external devices to one lower logical device needs to be managed by the lower logical device management information 201; or information for managing the RAID composed of external devices needs to be newly provided and managed by the CA 150, and the correspondence between the external devices of the RAID and the lower logical devices needs to be managed by the lower logical device management information 201.

In accordance with the present invention, a storage system can be connected to another storage system, and devices within the other storage system can be provided to a host computer as devices of the own storage system, and the processing load on the storage system which may be caused by processings for the devices within the other storage system can be reduced. Also, the connection configuration to the devices within the other storage system can be switched from one mode to another while input/output requests are continually received from the host.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A storage system comprising:
a first control unit coupled to a computer;
a second control unit coupled to the first control unit and a first storage device that stores data to be used by the computer, and including a processor that processes input/output requests from the computer and a memory that stores first control information indicating a configuration of the first storage device; and
a third control unit coupled to the first control unit and a second storage device that stores data to be used by the computer, and including another processor that processes input/output requests from the computer and another memory that stores second control information indicating a configuration of the second storage device,
wherein the first control unit receives from the computer a first input/output request including identification information, selects one of the second control unit or the third control unit based on the identification information, and sends a second input/output request corresponding to the first input/output request to the selected one of the second control unit or the third control unit,
wherein the processor, included in the second control unit, using the first control information in the memory, controls the second control unit to process input/output requests to the first storage device,
wherein the another processor, included in the third control unit, using the second control information in the another memory, controls the third control unit to process input/output requests to the second storage device,
wherein the storage system provides a logical volume which corresponds to the first storage device or the second storage device transparent from the computer,
wherein the control information comprises:
a size storing a capacity of a physical device,
a device state setting information indicating a state of the physical device,
a RAID configuration retaining information concerning RAID configuration, and
a stripe size retaining a length of a data dividing unit (stripe) in the RAID.

2. The storage system according to claim 1, wherein the first control unit upon receipt of the first input/output request judges whether a target logical volume to be accessed identified by the identification information is correlated to the first storage device or correlated to the second storage device and selects an appropriate access destination to the second control unit or the third control unit based on the judgment.

3. The storage system according to claim 2, further comprising:
a management unit that manages the identification information correlated to the second control unit or third control unit.

4. A storage system according to claim 3, wherein the management unit manages second identification information of the first storage device and second identification information of the second control unit being correlated to the identification information, and the first control unit converts the first input/output request to the second input/output request including the second identification information of the second control unit, and transmits the second input/output to the second control unit.

5. The storage system according to claim 1, further comprising:
a fourth control unit coupled to the first control unit,
wherein the first control unit selects a control unit using the identification information to send the input/output request.

6. A method in a storage system including a first control unit coupled to a computer, a second control unit coupled to the first control unit and a first storage device that stores data to be used by the computer, and including a processor that processes input/output requests from the computer and first control information corresponding to the first storage device, and a third control unit coupled to the first control unit and a second storage device that stores data to be used by the computer, and including another processor that processes input/output requests from the computer and second control information corresponding to the second storage device, said method comprising:

receiving, by the first control unit, from the computer a first input/output request including identification information;

selecting one of the second control unit or the third control unit based on the identification information; and sending a second input/output request corresponding to the first input/output request to the selected one of the second control unit or the third control unit, wherein the processor, included in the second control unit, using the first control information in the memory, controls the second control unit to process input/output requests to the first storage device, wherein the another processor, included in the third control unit, using the second control information in the another memory, controls the third control unit to process input/output requests to the second storage device, wherein the storage system provides a logical volume which corresponds to the first storage device or the second storage device transparent from the computer, wherein the control information comprises:

a size storing a capacity of a physical device, a device state setting information indicating a state of the physical device, a RAID configuration retaining information concerning RAID configuration, and a stripe size retaining a length of a data dividing unit (stripe) in the RAID.

7. The method according to claim 6, further comprising:

judging, by the first control unit upon receipt of the first input/output request judges, whether a target logical volume to be accessed identified by the identification information is correlated to the first storage device or correlated to the second storage device; and selecting an appropriate access destination to the second control unit or the third control unit based on the judgment.

8. The method according to claim 7, further comprising:

managing the identification information correlated to the second control unit or third control unit.

9. A method according to claim 8, further comprising:

managing second identification information of the first storage device and second identification information of the second control unit being correlated to the identification information;

converting, by the first control unit, the first input/output request to the second input/output request including the second identification information of the second control unit; and transmitting the second input/output to the second control unit.

10. The method according to claim 6, wherein the first control unit selects a control unit using the identification information to send the input/output request.

* * * * *